(12) United States Patent
Singh et al.

(10) Patent No.: US 10,387,426 B2
(45) Date of Patent: Aug. 20, 2019

(54) STREAMING MICROSERVICES FOR STREAM PROCESSING APPLICATIONS

(71) Applicant: StreamSimple, Inc., San Mateo, CA (US)

(72) Inventors: Chandni Singh, San Mateo, CA (US); Timothy Tibor Farkas, San Mateo, CA (US)

(73) Assignee: StreamSimple, Inc., San Mateo, CA (US)

( * ) Notice: Subject to any disclaimer, the term of this patent is extended or adjusted under 35 U.S.C. 154(b) by 0 days.

(21) Appl. No.: 16/172,644

(22) Filed: Oct. 26, 2018

(65) Prior Publication Data

US 2019/0130004 A1 May 2, 2019

Related U.S. Application Data

(63) Continuation of application No. PCT/US2018/057806, filed on Oct. 26, 2018.

(60) Provisional application No. 62/578,329, filed on Oct. 27, 2017.

(51) Int. Cl.
| | |
|---|---|
| *G06F 16/2455* | (2019.01) |
| *G06F 16/27* | (2019.01) |
| *G06F 16/28* | (2019.01) |
| *G06F 16/23* | (2019.01) |

(52) U.S. Cl.
CPC .... *G06F 16/24568* (2019.01); *G06F 16/2358* (2019.01); *G06F 16/278* (2019.01); *G06F 16/283* (2019.01)

(58) Field of Classification Search
CPC ............ G06F 16/24568; G06F 16/278; G06F 16/2358; G06F 16/283
See application file for complete search history.

(56) References Cited

U.S. PATENT DOCUMENTS

| | | | |
|---|---|---|---|
| 2016/0112475 A1 | 4/2016 | Lawson et al. | |
| 2016/0350006 A1 | 12/2016 | Wang et al. | |
| 2017/0103108 A1* | 4/2017 | Datta ..................... | G06F 9/448 |
| 2017/0124464 A1 | 5/2017 | Crabtree et al. | |

OTHER PUBLICATIONS

PCT/US2018/57806—International Search Report and Written Opinion dated Jan. 11, 2019, 23 pages.

* cited by examiner

*Primary Examiner* — Ashish Thomas
*Assistant Examiner* — Dustin D Eyers
(74) *Attorney, Agent, or Firm* — Haynes Beffel & Wolfeld LLP; Ernest J. Beffel, Jr.

(57) ABSTRACT

The technology disclosed relates to a system that provides exactly-once processing of stream data. The system includes a queue manager which receives a stream of data. The system establishes aggregation intermediation checkpoints during processing of the received data. To do this, the system partitions delivery of the data stream at offsets, saves partition demarcation offsets at the end of processing windows, and saves intermediate aggregation results to a distributed file system with a window identifier (abbreviated ID) that correlates the offsets and the aggregation results. At each checkpoint, the intermediate aggregation results can be initially saved on at least one write-ahead log (abbreviated WAL) on the distributed file system and, post-saving, persisted to storage in accordance with a fault tolerance scheme.

20 Claims, 32 Drawing Sheets

| key prefix | index | value |
|---|---|---|
| 3 | 1 | plane |
| 3 | 2 | banana |
| 3 | 3 | tree |
| 3 | 4 | bird |
| 3 | 5 | dog |
| 3 | 6 | cat |
| 3 | 7 | apple |
| 3 | 8 | pear |
| 3 | 9 | bear |
| 3 | 10 | dig |
| 3 | 11 | sail |
| 3 | 12 | horse | key = key prefix + index

FIG. 22

| Aggregation Map ||
| Key | Value |
| --- | --- |
| time: "Monday, June 26, 2017 (PDT) 5:24 PM"<br>timeBucket: "1m"<br>customer: "Target" | clicks: 105<br>views: 30 |

FIG. 29

| Aggregation Map ||
| Key | Value |
|---|---|
| time: "Monday, June 26, 2017 (PDT) 5:24 PM"<br>timeBucket: "1m"<br>customer: "Target" | clicks: 116<br>views: 33 |

FIG. 30

| Aggregation Map ||
| Key | Value |
| --- | --- |
| time: "Monday, June 26, 2017 (PDT) 5:24 PM"<br>timeBucket: "1m"<br>customer: "Target" | clicks: 116<br>views: 33 |
| time: "Monday, June 26, 2017 (PDT) 5:30 PM"<br>timeBucket: "1m"<br>customer: "Walmart" | clicks: 55<br>views: 45 |

FIG. 31

STREAMING MICROSERVICES FOR STREAM PROCESSING APPLICATIONS

PRIORITY APPLICATIONS

This application claims priority to or the benefit of U.S. Provisional Patent Application No. 62/578,329, titled "Streaming Microservices for Stream Processing Applications," filed on Oct. 27, 2017. The provisional application is hereby incorporated by reference for all purposes as if fully set forth herein; and This application claims priority to or the benefit of PCT Patent Application No. PCT/US2018/057806, titled "Streaming Microservices for Stream Processing Applications," filed on Oct. 26, 2018, subsequently published as PCT Publication No. WO 2019/084465. The PCT application is hereby incorporated by reference for all purposes as if fully set forth herein.

FIELD OF THE TECHNOLOGY DISCLOSED

The technology disclosed provides, within a computer or digital data processing system, for processes or apparatus for increasing a system's extension of protection of system hardware, software, or data from maliciously caused destruction, unauthorized modification, or unauthorized disclosure. In particular, the technology disclosed relates to exactly-once processing of stream data.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

As the need for real-time big data analytics grows, more data operators will build new big data pipelines or reimplement their existing pipelines in an attempt to improve performance. However, the process of building a big data pipeline poses a number of challenges. Provisioning and operating big data platforms is time consuming and difficult. Engineers with expertise in big data are expensive and rare, and implementing performant and fault-tolerant pipelines is difficult even for experienced engineers. Building custom data pipeline requires hardware, many human resources, and a large time frame. Monitoring, operating, and debugging a pipeline is expensive and difficult, and implementing a pipeline requires many different technologies. Support licenses for many big data technologies are expensive.

To overcome these difficulties, we analyzed a variety of production data pipelines. Our analysis resulted in the discovery that the logic contained in the production data pipelines falls into two categories—(1) generic processing and (2) custom processing. Generic processing includes processing tasks that are commonly performed by most big data operators. Some examples of generic processing tasks are filtering, enrichment, and aggregation. Custom processing executes business logic that is highly specific to a particular entity.

Generic processing is usually performed on large data sets and is difficult to implement in a performant and fault-tolerant manner. Custom processing is done on smaller data sets and has well-defined specifications. Because of the implementation difficulty and pervasiveness of generic processing use cases, it is desirable to implement generic processing use cases as streaming microservices.

An opportunity arises to implement streaming microservices as powerful data processing tools that accelerate application development and deployment, improve performance, and reduce the cost of provisioning and maintaining data pipelines.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 22 is one implementation of a spillable array list using the disclosed spillable map.

FIG. 29 illustrates the state of the aggregation map.

FIG. 30 illustrates the new state of the aggregation map.

FIG. 31 illustrates yet another state of the aggregation map.

DETAILED DESCRIPTION

Figure 1:
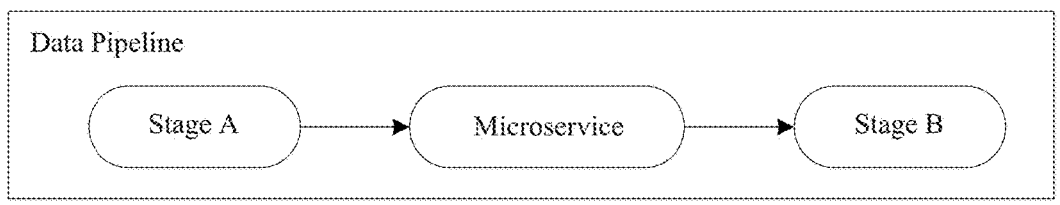
FIG. 1 illustrates one implementation of a streaming microservice.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

INTRODUCTION

Stream processing architectures should handle numerous stream sources on shared hardware. The sharing of hardware would reduce total resource requirements, both for steady and time varying stream processing.

Microservices are pipelined stages of processing organized to handle each stream source. It is desirable to mix standard and custom microservices in a pipeline, for flexibility in handing different users' requirements.

High pipeline throughput is required, so writing to ultimate persistent memory is limited and writing to fast intermediate persistent memory is required. Traditional SQL logs are not nearly fast enough for stream processing on reasonably scaled hardware.

Concentrated processing of multiple streams with respective microservice pipelines on a single platform increases the frequency of failure and the need for efficient and reliable restarts. Failure recovery is difficult for systems that have multiple microservices in different microservice pipelines, that rely on intermediate memory buffering, that process numerous variables, and that require exactly-once processing. Aspects of the technology disclosed produce exactly-once processing even in the face of this combination of difficult factors.

When events flow through a microservice, they belong to a window. A window has a beginning and an end and when one window of events finishes, the next window of events begins. In some implementations, different components of a microservice can be on different windows at different times.

A checkpoint is a periodic snapshot of an in-memory state. Checkpoints occur at the end of every N windows. A checkpoint is associated with the window that finished immediately before it.

In the event of a failure, the technology disclosed rollbacks to a previous checkpointed window. It then restores the in-memory state and replays all the windows after the checkpointed window.

A committed window is a window that the technology disclosed knows will never be replayed even in the event of a failure. The disclosed streaming microservice periodically notifies it's components when windows are committed. Consider a microservice whose components have completed processing past window 100 and each component has a checkpoint at window 90. Here, any window before or including window 89 will not be replayed because in the event of a failure the furthest one would want to rollback to is window 90.

An important consequence of the technology disclosed is guaranteeing idempotence for restarts from a checkpoint when consuming data from a message queue The disclosed streaming microservice has two types of write-ahead logs (WALs). The first WAL, referred to herein as the "input WAL", guarantees idempotent consumption from a data source even in the event of failures. Here, idempotence or idempotency means that the same set of events are consumed from the message queue for a given window, even if the window is reprocessed due to failure.

The second WAL, referred to herein as the "storage WAL", applies to data that is aggregated, deduplicated, and/or persisted in long-term storage. The storage WAL ensures that such data remains uncorrupted even in the event of failures.

The input WAL and storage WAL are work synergistically because the storage WAL depends on the idempotence provided by the input WAL. Specifically, the process of persisting data by first writing to the storage WAL and then transferring from the storage WAL to long-term storage requires the upstream data source to be idempotent even in the event of failures. This idempotency is provided by the input WAL.

Consider that events 1, 2, 3, and 4 are read from the queue in window 2 and written out to the input WAL at the end of the window 2. Then, events 5 and 6 are read from the queue in window 3 and written out at the end of the window 3. Now consider that a failure occurs, which in turn triggers a rollback to the beginning of window 2. The failure results in reading of events 1, 2, 3, and 4 from the input WAL in window two and their subsequent emission. Similarly, events 5 and 6 are read from the input WAL in window three and emitted.

A difference between the input WAL and the storage WAL lies in what they do when a window is committed. In the input WAL, when a window is committed, all the data before and including the committed window is deleted from the input WAL since we know we will never have to replay it. In the storage WAL, when a window is committed, all the data before and including the committed window is moved to permanent storage and deleted from the storage WAL. Data for committed windows is removed from the storage WAL and periodically transferred to long-term storage.

We aggregate data coming from multiple tenants onto the same message queue topic. So, we have multiple sources of data coming in (e.g., one from each tenant), but all the data goes into the same topic. The message queue topics are used to connect microservices together such that if we have N microservices, we can have N topics.

Streaming Microservice

A "microservice" is an individual component of a large application that performs a well-defined specific function. Other components interact with a microservice through a set of well-defined application programming interfaces (APIs). According to one implementation of the technology disclosed, a microservice can have the following characteristics: (i) the microservice runs on the cloud, (ii) the microservice requires little to no management or maintenance by a user, (iii) the microservice is fault-tolerant, and/or (iv) the microservice has high availability.

A "streaming microservice" is a microservice that can be embedded in a data processing pipeline. A visual representation of a streaming microservice and how it is used is provided in FIG. 1. Streaming microservices have many benefits. With a streaming microservice, the responsibility for delivering a performant processing stage lies on the host and the users are shielded from all the technical difficulties involved in implementing a performant big data processing pipeline. The users do not have to provision and maintain a compute cluster to run the streaming microservice. The users can rely on the high availability and fault tolerance of the streaming microservice, without having to understand or implement complex high availability and fault-tolerant techniques. With the streaming microservice serving as the underlying data processing platform, the users can utilize a wide variety of user friendly development tools to build their big data applications and pipelines. This way, the users only have to learn a simple application programming interface (API) to send data to and receive data from the stream microservice.

Furthermore, streaming microservices can easily be plugged into any stage or component of users' custom data processing pipelines. The users can accelerate the development and deployment of their data processing pipelines because the streaming microservices handle the most data intensive portions of the pipelines. Streaming microservices obviate the need of staffing big data specialists because the data intensive tasks are already implemented by the streaming microservices.

Streaming Microservice Architecture

Having introduced streaming microservices, the discussion now turns to what constitutes the disclosed streaming microservice and how multiple streaming microservices are connected by the technology disclosed.

Construction of a Streaming Microservice

The following discussion describes how the disclosed fault-tolerant streaming microservice is built on top of the disclosed stream processing engine.

The disclosed streaming microservice is constructed using a stream processing engine. The disclosed stream processing engine enables users to write applications which, almost perpetually, consume data from sources and write data to sinks. It deploys a user's application onto a compute cluster so that the user's code executes in containers on multiple nodes. It also provides mechanisms for handling container failures.

Figure 2:
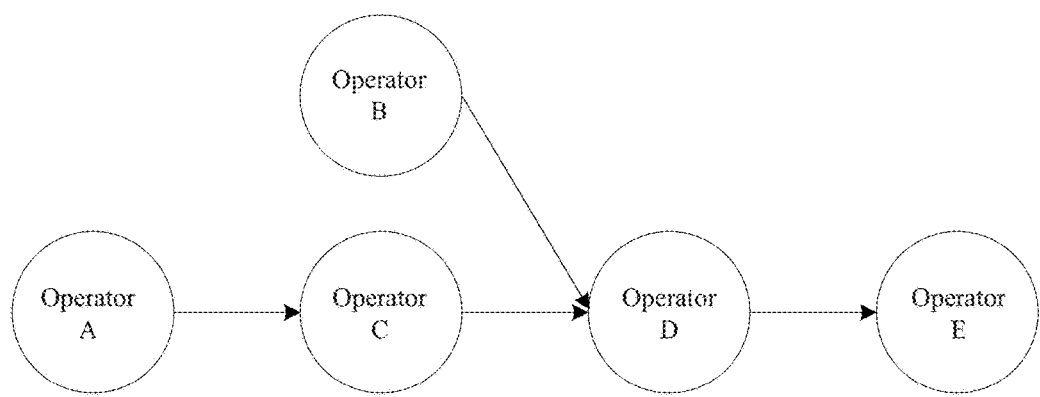
FIG. 2 depicts an example logical directed acyclic graph (DAG).

The disclosed stream processing engines have various features such as operators, tuples, logical directed acyclic graphs (DAGs), input operators, output operators, partitions, physical operators, partitioning, physical DAGs, and operator IDs. An "operator" is a piece of user-defined code that consumes input tuples, performs some computations on them, and emits output tuples. Operators run in a container on a node in a compute cluster. Also, connections between the operators can be one-way. A "tuple" is a unit of data that is exchanged between operators. A logical DAG is a set of operators connected to form a DAG. The logical DAG can form a connected graph and each operator in the DAG can run on a different node in a compute cluster. FIG. 2 depicts an example logical DAG.

Figure 3:
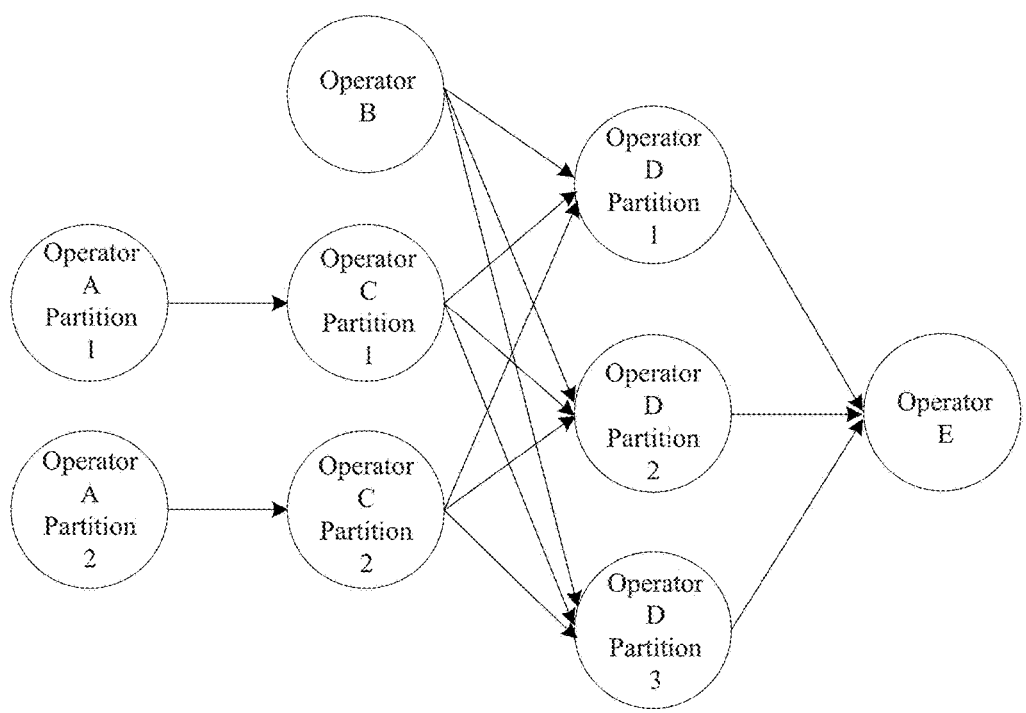
FIG. 3 shows an example physical DAG corresponding to the logical DAG in FIG. 2.

An "input operator" is an operator that is a source of tuples in a DAG. Input operators usually retrieve data from external data sources. An "output operator" is an operator that is a sink for tuples in a DAG. Output operators usually write data out to external data sinks. An operator can be duplicated so that the workload of the operator is divided among multiple containers running on multiple nodes. Each duplicate of the operator is called a "partition". A "physical operator" is a partition of an operator. "Partitioning" is the process of creating partitions of an operator and distributing the tuples being sent to the operator between all of the partitions of the operator. A "physical DAG" represents how all the containers deployed for a streaming application are connected together. The physical DAG can be constructed by taking the logical DAG and replacing each partitioned operator with all of its partitions. FIG. 3 shows an example physical DAG corresponding to the logical DAG in FIG. 2. An "operator ID" is a unique ID that is assigned to each physical operator.

Accordingly, the disclosed streaming microservice is a set of custom operators connected together to form a DAG. The DAG runs on the disclosed stream processing engine, which in turn is hosted on a compute cluster.

Exactly-Once Processing

The following discussion describes how the disclosed exactly-once streaming microservice is built.

The disclosed streaming microservice has exactly-once semantics because it never loses data in the event of a failure and it never duplicates data in the event of a failure. The disclosed streaming microservice is constructed on a stream processing engine that has various features such as processing windows, processing window IDs, checkpointing, checkpoint IDs, checkpoint timestamp, committed checkpoint, committed ID, and recovery checkpoint ID.

As tuples are transferred between operators, markers are placed between the tuples. These markers define the start and end of "processing windows". Processing windows are used to group tuples together and to associate a "processing window ID" with the tuples. An operator, which is not an input operator, is usually said to be on a particular processing window between the time that the start and end window markers arrive for that processing window. Input operators generate the window markers and are said to be on a processing window between the time the start and end window markers are sent to downstream operators. Input operators place processing window markers between the tuples at a periodic time interval. When the processing window markers are received by operators, they are passed down to downstream operators.

The "processing window ID" is used for checkpointing and idempotency. Each operator executes processing windows asynchronously. So, in some implementations, different operators can be on different processing windows at any given time.

The process of "checkpointing" involves periodically snapshotting the in-memory state of physical operators and persisting it to a durable and highly available store. Checkpointing can occur after every processing window or after every n processing windows. Also, since processing windows are processed asynchronously, different operators can reach the same checkpoint at different times.

A "checkpoint ID" is the ID of the processing window after which a checkpoint is taken. In some implementations, when multiple physical operators in a physical DAG have a checkpoint taken after the same processing window, the same checkpoint ID is associated with the checkpoint of each physical operator.

Each checkpoint has a timestamp associated with it, referred to as "checkpoint timestamp". The checkpoint timestamp represents the approximate time at which the checkpoint happened. In one implementation, it is calculated using the following formula:

$$\text{application start time} + (\text{checkpoint number} * \text{checkpointinterval})$$

A "committed checkpoint" is the most recent checkpoint that every operator in the DAG is guaranteed to never be rolled back to. A "committed ID" is the ID of the committed checkpoint.

A "recovery checkpoint ID" is the ID of the checkpoint that is used to restore a failed operator.

Notification Modules

When certain events occur, the disclosed stream processing engine notifies the user code and executes it. The following is a list of notification modules that it can use to communicate with the user code:

Setup: This notification module is called in two cases. Once, when the operator starts for the first time. Second, after the operator fails and is restored from a checkpoint, but before it starts processing the first processing window that comes after the checkpoint. In the second case, the recovery checkpoint window ID is provided to the invoked user code.

BeginWindow: This notification module is called when an operator starts a new processing window.

EndWindow: This notification module is called when an operator finishes a processing window.

BeforeCheckpoint: This notification module issues a synchronous notification that allows the user code to run immediately before a checkpoint is taken.

Committed: This notification module issues an asynchronous notification that allows the user code to run when a checkpoint is committed. The committed notification contains the corresponding committed ID.

ProcessTuple: This notification module is called when the operator receives a tuple within a processing window. The received tuple is given to the user code for processing.

In some implementations, each of these notification modules is triggered for each physical operator.

Simulation A

Figure 4:
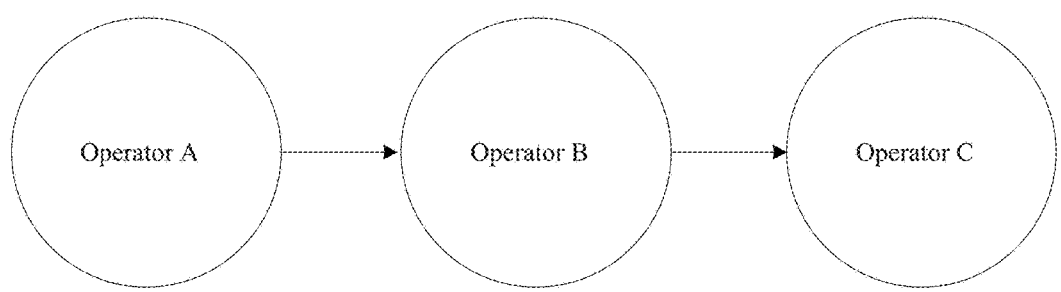
FIG. 4 shows another example physical DAG, referred to as "DAG A".
Figure 5:
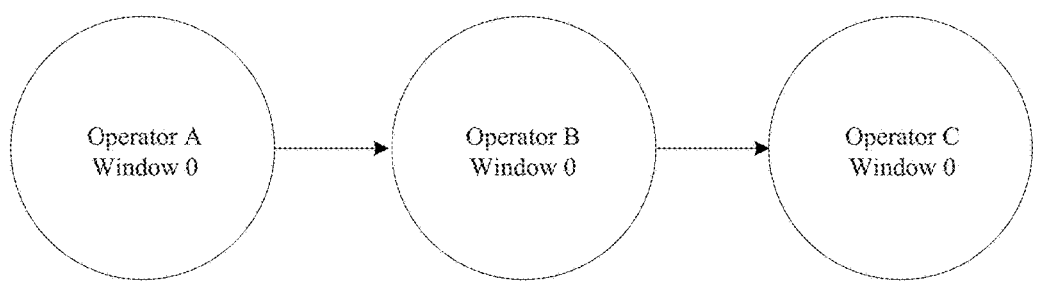
FIG. 5 illustrates a current state of DAG A at a particular stage of Simulation A.

FIG. 4 shows another example physical DAG, referred to as "DAG A". The following discussion describes how DAG A runs on the disclosed stream processing engine. In FIG. 4, Operator A is the input operator and Operator C is the output operator. Also, each operator has one partition. The following Simulation A runs DAG A without failures:

1. Setup is called on all the operators.
2. Operator A generates the start Window 0 marker.
3. Operator A calls BeginWindow.
4. Operator A is now on Window 0.
5. Operator A sends the start Window 0 marker to Operator B.
6. Operator B calls BeginWindow.
7. Operator B is now on Window 0.
8. Operator B sends the start Window 0 marker to Operator C.
9. Operator C calls BeginWindow.
10. Operator C is now on Window 0.
11. Now all the operators are on Window 0.
12. FIG. 5 illustrates the current state of DAG A.
13. Operator A now generates tuple w0t0a and sends it to Operator B.
14. Operator B receives w0t0a and calls processTuple.
15. Operator B has a hashmap and adds a key-value pair (w0t0a→1).
16. Operator B creates w0t0b from w0t0a and sends w0t0b to Operator C.
17. Operator C receives tuple w0t0b and calls processTuple.
18. Operator C writes w0t0b out to a database in the processTuple callback.
19. Operator A generates the end Window 0 marker.
20. Operator A calls the endWindow callback for Window 0.
21. Operator A sends the end Window 0 marker to Operator B.
22. Operator B receives the end Window 0 marker and calls the endWindow callback for Window 0.
23. Operator B sends the end Window 0 marker to Operator C.
24. Operator C receives the end Window 0 marker and calls the endWindow callback for Window 0.
25. Each operator calls the beforeCheckpoint callback for Window 0.
26. A checkpoint is generated for each operator for Window 0.
27. Operator A generates the start Window 1 marker.
28. Operator A calls BeginWindow.
29. Operator A is now on Window 1.
30. Operator A sends the start Window 1 marker to Operator B.
31. Operator B calls BeginWindow.
32. Operator B is now on Window 1.
33. Operator B sends the start Window 1 marker to Operator C.
34. Operator C calls BeginWindow.
35. Operator C is now on Window 1.
36. Now all the operators are on Window 1.
37. Operator A now generates tuple w1t0a and sends it to Operator B.
38. Operator B receives w1t0a and calls processTuple.

Figure 6:
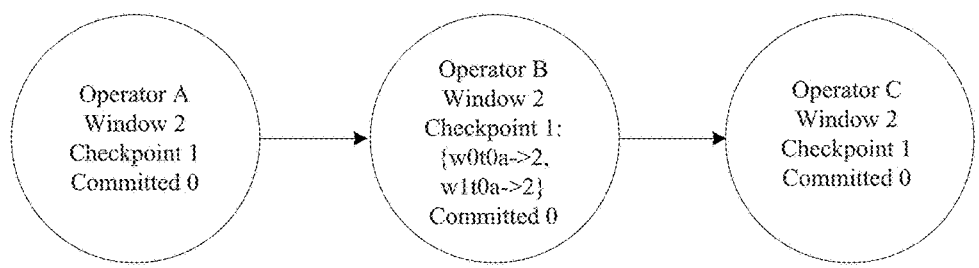
FIG. 6 illustrates another current state of DAG A at another stage of Simulation A.

39. Operator B has a hashmap and adds a key-value pair (w1t0a→2).
40. Operator B creates w1t0b from w1t0a and sends w1t0b to Operator C.
41. Operator C receives tuple w1t0b and calls processTuple.
42. Operator C writes w1t0b out to a database in the processTuple callback.
43. Operator A generates the end Window 1 marker.
44. Operator A calls the endWindow callback for Window 1.
45. Operator A sends the end Window 1 marker to Operator B.
46. Operator B receives the end Window 1 marker and calls the endWindow callback for Window 1.
47. Operator B sends the end Window 1 marker to Operator C.
48. Operator C receives the end Window 1 marker and calls the endWindow callback for Window 1.
49. Each operator calls the beforeCheckpoint callback for Window 1.
50. A checkpoint is generated for each operator for Window 1.
51. Committed is called on each operator for the checkpoint of Window 0.
52. Operator A generates the start Window 2 marker.
53. Operator A calls BeginWindow.
54. Operator A is now on Window 2.
55. Operator A sends the start Window 2 marker to Operator B.
56. Operator B calls BeginWindow.
57. Operator B is now on Window 2.
58. Operator B sends the start Window 2 marker to Operator C.
59. Operator C calls BeginWindow.
60. Operator C is now on Window 2.
61. FIG. 6 illustrates the current state of DAG A.

Simulation B

Simulation B repeats stages 1-45 of Simulation A, but, unlike Simulation A, it causes a failure in DAG A.

Figure 7:
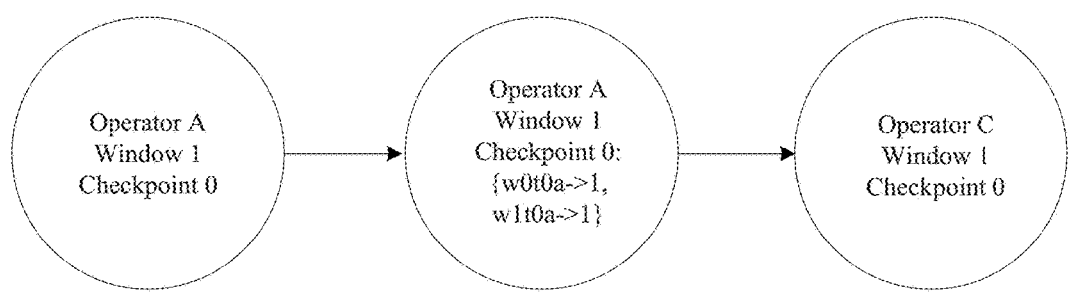
FIG. 7 illustrates a current state of DAG A at a particular stage of Simulation B.
Figure 8:
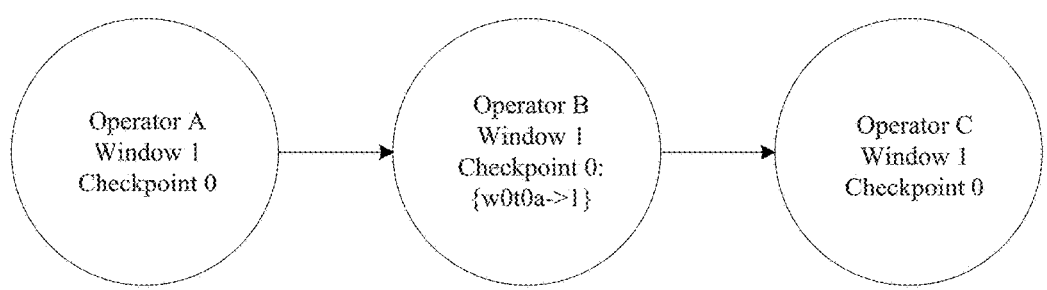
FIG. 8 illustrates another current state of DAG A at another stage of Simulation B.

1. Repeat steps 1-42 in Simulation A.
2. FIG. 7 illustrates the current state of DAG A.
3. Operator B fails.
4. When Operator B fails, Operator B and all its downstream operators (such as Operator C) are restored from a checkpoint.
5. Operator A continues processing, Operator B is restored from its checkpoint at Window 0, and Operator C is restored from its checkpoint at Window 0.
6. Operator B and Operator C both call their Setup callback.
7. Operator B receives the start Window 1 marker.
8. Operator B calls BeginWindow.
9. Operator B is now on Window 1.
10. Operator B sends the start Window 1 marker to Operator C.
11. Operator C calls BeginWindow.
12. Operator C is now on Window 1.
13. FIG. 8 illustrates the current state of DAG A.

Components of the Streaming Microservice

The disclosed streaming microservice is a set of custom operators connected together to form a DAG that runs on top of the disclosed stream processing engine. In one implementation, the disclosed streaming microservice comprises an input operator, an output operator, a write-ahead log (WAL) implementation for idempotence, and an incremental state.

The disclosed streaming microservice provides an implementation of an input operator that consumes data from a desired external source. The input operator is written such that it can be partitioned. Partitioning allows the ingestion of data to be scaled up.

The disclosed streaming microservice provides an implementation of an output operator that writes data to a desired data sink. The output operator is also written such that it can be partitioned.

The disclosed streaming microservice provides a WAL implementation for idempotence that stores data for each completed window in a fault-tolerant manner and leverages the notifications of the disclosed stream processing engine. The disclosed WAL enables the input operators to consume data from sources idempotently. Idempotent consumption in turn enables the disclosed exactly-once streaming microservices. The disclosed WAL enables the output operators to write data to data sinks exactly once.

Incremental state is a fault-tolerant storage layer that leverages the notifications of the disclosed stream processing engine. The incremental state also allows the operators of the disclosed streaming microservice to store streaming data in a fault-tolerant way.

Figure 9:
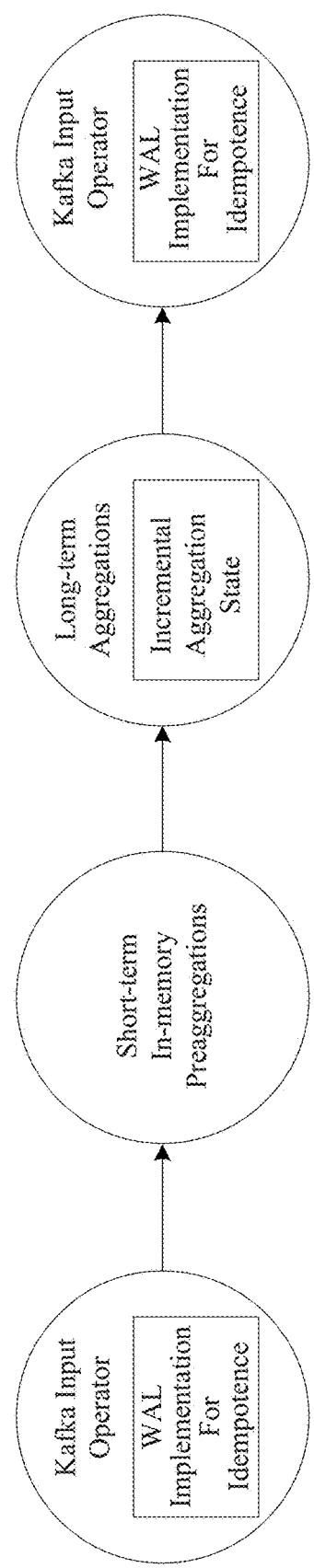
FIG. 9 shows an example aggregation streaming microservice.

FIG. 9 shows an example aggregation streaming microservice that has the following operators:

Kafka Input Operator: This operator idempotently consumes data from Kafka by leveraging the disclosed WAL implementation for idempotence.

The Short-term Aggregation Operator: This operator stores aggregations in-memory for short periods of time. In some implementations, this operator may not leverage components like the disclosed WAL or incremental state.

The Long-term Aggregation Operator: This operator stores aggregations for long periods of time in the Incremental Aggregation State component.

Kafka Output Operator: This operator writes to Kafka exactly once by leveraging the disclosed WAL implementation for idempotence.

In one implementation, the disclosed streaming microservice is complete when the operators are connected together to form a DAG and are executed on the disclosed stream processing engine.

Interconnection of Microservices and Clients

The disclosed streaming microservice is a set of custom operators connected together to form a DAG that runs on top of the disclosed stream processing engine. In one implementation, the disclosed streaming microservice comprises an input operator, an output operator, a write-ahead log (WAL) implementation for idempotence, and an incremental state.

Many production applications require connecting multiple microservices together and embedding them into a larger pipeline. We disclose a novel method for easily connecting microservices and embedding them into production pipelines. This novel method provides the following benefits:

Guarantee 1, Fault-tolerance: From the user's perspective, a microservice will never go down. They will always be able to send events to and consume events from a microservice without data loss or data duplication.

Guarantee 2, Live Upgrades: A microservice can be upgraded in production without the user experiencing down time. The user can continue to send events to and receive events from a microservice without data loss or data duplication.

The following section describes the architecture that allows us to deliver the two benefits described above.

The architecture that enables the fault-tolerant interconnection of microservices to create data pipelines comprises three main components:

Microservice: These are the microservices described above.

Message Queue: Here, the term "message queue" refers to a fault-tolerant distributed queue like (but not limited to) Apache Kafka.

Topic: A topic is a named and isolated queue on a message queue. Specifically, events sent to topic1 on a message queue cannot be consumed from topic2 on the same message queue and vice-versa. Additionally, events sent to topic1 can only be consumed from topic1.

Fault-Tolerance

This section describes how fault-tolerance Guarantees 1 and 2 are achieved. In order to explain these guarantees, we first define possible sources and sinks. A microservice can consume events from or send messages to one of three places: (1) a client, (2) another microservice, and (3) a fault-tolerance database.

In order to provide Guarantees 1 and 2, we insert a message queue between a microservice and its source or sink in two cases: (1) the source or sink is a client and (2) the source or sink is another microservice. In some implementations, the message queue is not required to provide fault-tolerance in the cases where a microservice consumes messages from or sends messages to a fault-tolerant database. Consider a microservice called microservice 1. In the two cases above, the message queue allows a client or external microservice to interact with microservice 1 regardless of the state of microservice 1. Even if microservice 1 is down, the message queue will receive events for microservice 1 and persist them and buffer events that were produced by microservice 1 when it was still up. This allows clients or other microservices to continue consuming the results of microservice 1.

Configuring Microservice Connections

Now we will describe how to configure microservices and clients to send and receive data from a message queue. Consider the following case:

We have microservice 1 and we want to send data to it from client 1.

We want to send the results of microservice 1 back to client 1 or to client 2.

In one implementation, this example can be implemented with the following steps:
1. The message queue is initialized with two topics:
   Input Topic 1
   Input Topic 2
2. Client 1 is configured to send messages to Input Topic 1. In some implementations, Client 1 provides the appropriate authentication credentials to send messages to Input Topic 1.
3. Microservice 1 is configured to consume events from Input Topic 1 and to send results to Output Topic 1.
4. Then either Client 1 or Client 2 can be configured to consume events from Output Topic 1. In some implementations, Client 1 and Client 2 provide the appropriate authentication credentials to consume messages from Output Topic 1.

Figure 10:
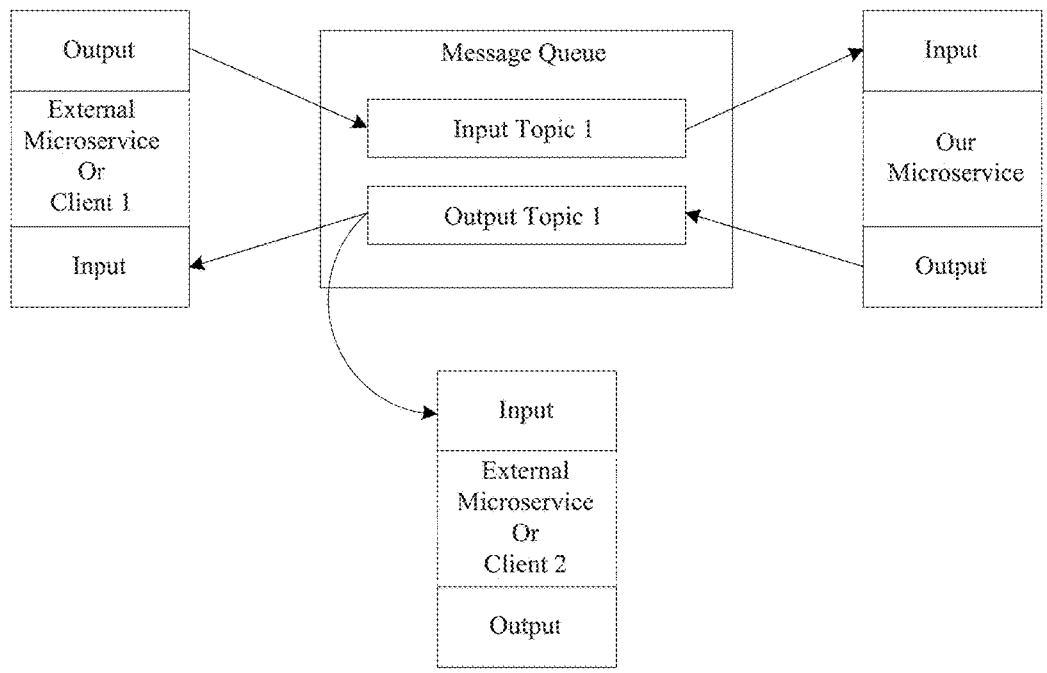
FIG. 10 is one implementation of consumption of events by a microservice.

FIG. 10 is one implementation of consumption of events by a microservice. Events flow through the system illustrated in FIG. 10 in the following way:
1. Client 1 is authenticated to send messages to Input Topic 1.
2. Client 1 produces an event. The event is sent to Input Topic 1 of the message queue.
3. Microservice 1 consumes the event from Input Topic 1.
4. Then Microservice 1 produces result events, which are sent to Output Topic 1 of the message queue.
5. Client 1 or Client 2 is authenticated to consume messages from Output Topic 1.
6. Then either Client 1 or Client 2 reads the result events for Output Topic 1 of the message queue.

Embedding Microservices into Custom Data Pipelines

Having described how the disclosed streaming microservices, referred to herein as "StreamSimple microservices", can be connected to external data sources and sinks, the discussion now turns to how the StreamSimple microservices can be embedded into custom data pipelines.

Combining StreamSimple Microservices

Figure 11:
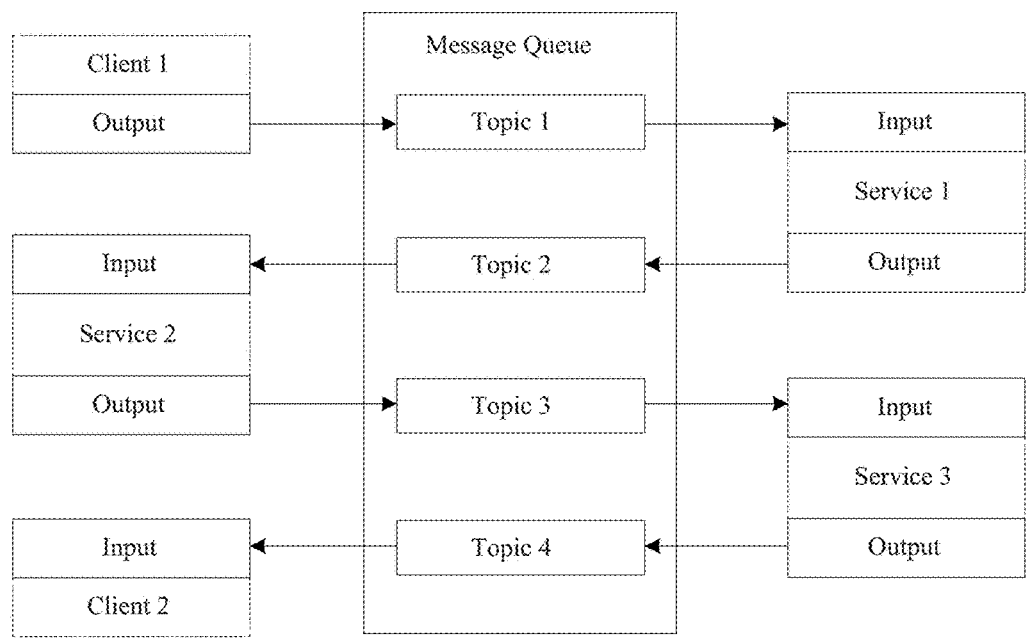
FIG. 11 shows one implementation of how the disclosed streaming microservices, referred to herein as "StreamSimple microservices", can be combined to form a data pipeline.

FIG. 11 shows how multiple StreamSimple microservices can be combined to form a data pipeline. The example data pipeline illustrated in FIG. 11 is composed of three StreamSimple microservices and is constructed with the following steps:
1. Topics 1, 2, 3, and 4 are created in the message queue.
2. Client 1 is configured to send events to Topic 1 of the message queue.
3. Service 1 is configured to consume events from Topic 1 of the message queue and is configured to send results to Topic 2 of the message queue.
4. Service 2 is configured to consume events from Topic 2 of the message queue and is configured to send results to Topic 3 of the message queue.
5. Service 3 is configured to consume events from Topic 3 of the message queue and is configured to send results to Topic 4 of the message queue.
6. Client 2 is configured to consume results from Topic 4 of the message queue.

Events flow through the system illustrated in FIG. 11 in the following way:
1. An event is produced by Client 1 and sent to Topic 1 of the message queue.
2. Service 1 consumes the event from Topic 1 of the message queue, processes it, and sends its results to Topic 2 of the message queue.
3. Service 2 consumes the results from Topic 2 of the message queue, processes it, and sends its results to Topic 3 of the message queue.
4. Service 3 consumes the results from Topic 3 of the message queue, processes it, and sends its results to Topic 4 of the message queue.
5. Client 2 consumes the results from Topic 4 of the message queue.

The examples above show how to build a data pipeline out of three StreamSimple microservices, however it can easily be extended to N (where N>=1) microservices with the following algorithm:
1. N+1 topics are created in the message queue with names Topic 1 to Topic N+1.
2. Client 1 sends events to Topic 1.
3. Service K consumes events from Topic K and send results to Topic K+1.
4. Client 2 consumes results from Topic N+1.

Combining StreamSimple Microservices with Other Services

The method described above combines multiple StreamSimple microservices. However, it can be extended to build pipelines with a mixture of StreamSimple microservices and external services. In order to accomplish this, external services satisfy two properties:

An external service that receives events from a StreamSimple microservice is capable of consuming events from a topic of the message queue.

An external service that sends events to a StreamSimple microservice is capable of publishing events to a topic of the message queue.

Figure 12:
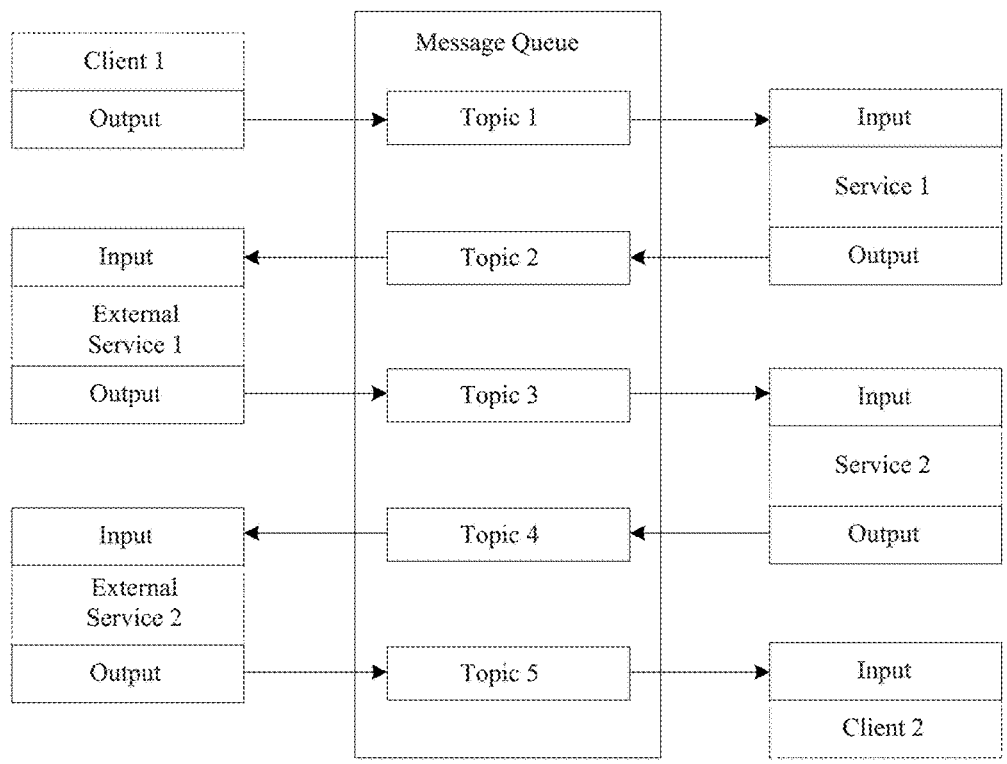
FIG. 12 shows one implementation of a custom pipeline that contains the StreamSimple microservices.

In order to illustrate these requirements in action, consider an example where we want to build a custom pipeline which contains StreamSimple microservices and external services that are not managed by StreamSimple. FIG. 12 shows one implementation of a custom pipeline that contains the StreamSimple microservices. In FIG. 12:

1. The data source is Client 1, which sends data to the custom pipeline.
2. The first stage of the custom pipeline is a StreamSimple service ("Service 1").
3. The second stage of the custom pipeline is an external service ("External Service 1").
4. The third stage of the custom pipeline is a StreamSimple service ("Service 2").
5. And the final stage of the custom pipeline is an external service ("External Service 2").
6. The results of External Service 2 are then consumed by a client ("Client 2").

Events flow through the system illustrated in FIG. 12 in the following way:

1. An event is produced by Client 1 and sent to Topic 1 of the message queue.
2. Service 1 consumes the event from Topic 1 of the message queue, does some processing, and sends its results to Topic 2 of the message queue.
3. External Service 1 consumes the results from Topic 2 of the message queue, does some processing, and sends its results to Topic 3 of the message queue.
4. Service 2 consumes the results from Topic 3 of the message queue, does some processing, and sends its results to Topic 4 of the message queue.
5. External Service 2 consumes the results from Topic 4 of the message queue, does some processing, and sends its results to Topic 5 of the message queue.
6. Client 2 consumes the results from Topic 5 of the message queue.

The examples above show how to build a data pipeline out of two StreamSimple microservices and two external microservices, however it can easily be extended to N (where N>=1) total StreamSimple and external microservices using the same algorithm as described above:

1. N+1 topics are created in the message queue with names Topic 1 to Topic N+1.
2. Client 1 sends events to Topic 1.
3. The Kth service (Stream Simple service or external service) consumes events from Topic K and sends the results to Topic K+1.
4. Client 2 consumes results from Topic N+1.

Note that this algorithm is not restricted to a pipeline that alternates between StreamSimple and external microservices. In other implementations, any ratio of StreamSimple service to external services and order of services is allowed when building a custom data pipeline.

Write-Ahead Log (WAL)

The disclosed WAL implementations are used in operators of a streaming application for one of these purposes:

1. Recording state each processing window for idempotent processing.
2. Making operators that write to message queue exactly-once
3. Capturing incremental state and its recovery.

A WAL uses a distributed file system like Hadoop Distributed File System (HDFS). The distributed file system has the following properties: durable, highly available, supports appending to files, supports atomic renames of files, and supports atomic deletion of files.

WAL Part Files

Figure 13:
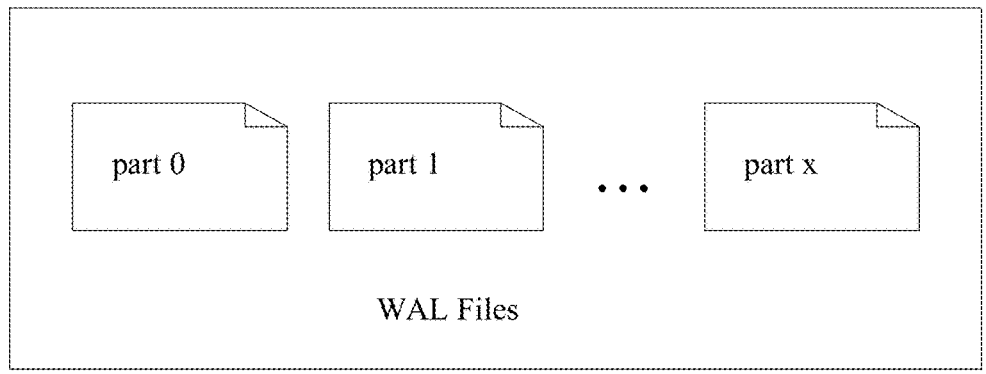
FIG. 13 shows part files of a write-ahead log (WAL).

FIG. 13 shows part files of a write-ahead log (WAL) that are written on a distributed filesystem. The part files are used to store the data in the WAL. The data in the part files are stored as WAL entries.

WAL entries have the following properties:

They each contain:

The ID of the processing window in which the WAL entry's state is stored.

The state the user wanted to store in the WAL for a processing window.

The size of the user's serialized state in bytes.

All the data for a WAL entry is contained in a single part file.

There is only one WAL entry for a particular processing window.

Part files have the following properties:

Part files have a sequence. Data are appended to part X+1 only after part X is complete.

A part file can contain more than one WAL entry.

A part file is complete when its size becomes greater than or equal to the maximum length of a part file. A WAL entry is appended to a part file if the current size is less than the maximum length of a part file.

Fault-Tolerant Message Queue Connectors

The following sections describe how to create message queue connectors that run on the disclosed stream processing engine and are fault-tolerant. In order to build fault-tolerant message queue connectors, the following properties are provided by the message queue:

The message queue allows messages to be composed of a sequence of bytes.

Messages stored in the message queue for a particular topic have an offset.

The message queue allows a client to seek to a particular offset of a topic and start consuming messages starting from that offset.

The offset of a message sent to a topic of the message queue by a client can be determined by the client.

WAL Implementation for Idempotence

The WAL implementation for idempotence enables operators to store data at the end of each processing window, and allows an operator to query the data stored for each previous processing window. This functionality is useful for making input and output operators idempotent and fault-tolerant. An operator can use the WAL by doing the following:

1. During normal operation, the operator stores data at the end of each processing window into the WAL.
2. After recovering from failure, the operator can query the WAL for data stored in a previous processing windows.

The WAL implementation for idempotence stores its data in part files, as described above. In addition to the part files, the WAL keeps track of a start offset and end offset in the part files. However, unlike the WAL implementation for incremental state, we do not rely on the disclosed stream processing engine checkpointing mechanism to store the start pointer and end pointer for us. Instead, we compute them from the WAL itself when they are needed. The discussion below describes how the WAL interacts with part files, how the start pointer is computed, and how the end pointer is computed to provide the functionality described above. It also describes how failures are handled.

Normal Processing

This section describes how the WAL performs various operations when there is no failure.

Appending to the WAL: This describes how the WAL works when data for new processing windows is appended to it.
1. An operator uses the WAL.
2. The operator starts processing.
3. At the end of each processing window, the operator saves data into the WAL. When data is saved into the WAL, a WAL entry containing the data and associated processing window ID is created and written to a part file of the WAL. There are three cases when a WAL entry is written to a part file:
   a. First WAL entry: In this case, this is the first WAL entry ever written to the WAL. So part file 0 is created and the WAL entry is appended to it.
   b. Append to current part file: In this case the WAL entry is appended to the current part file because the size of the current part file is smaller than the max length of a part file.
   c. Append to next part file: In this case the current part file has a size that is greater than or equal to the maximum length of a part file. So the next part file is created and the WAL entry is appended to the next part file.

Pruning the WAL: When the disclosed stream processing engine commits a checkpoint, the part files containing data for processing windows before the committed window or for the committed window are no longer needed. So they are pruned to save space. This pruning is done with the following steps:
1. The processing window IDs of the WAL entries in the part files are sequentially read, starting with the first available part file, until the first WAL entry with a processing window ID greater than the committed ID is read. This WAL entry is called the first uncommitted entry. The part file that contains the first uncommitted entry is called the first uncommitted part file.
2. All the part files before the first uncommitted part file can be deleted, because the data contained in them will never be needed again. The part files should be deleted sequentially from the oldest to the youngest.

Fetching Data for a Processing Window from the WAL: In this case, data for a particular processing window is retrieved from the WAL:
1. Starting with the oldest part file, WAL entries are sequentially read from the part files until the WAL entry corresponding to the desired processing window is found.
2. Once the desired WAL entry is found, the state saved in the WAL entry is returned to the user.
3. In some implementations, it is efficient to search for processing windows in increasing order because the WAL entries are in increasing order of processing window ID. For subsequent searches, the search can start from the current point in the WAL and not the oldest part file.

Failure Processing

This section describes how the WAL handles failures when performing certain operations.

Appending to the WAL: This describes how the WAL recovers when a failure occurs as it is appending a new WAL entry.

1. An operator uses the WAL.
2. The operator starts processing.
3. At the end of a processing window, the operator fails while appending to the WAL.
4. The operator is restored from a checkpoint.
5. The operator then checks to see if the WAL is corrupt by checking if the last part file is corrupt.
6. The is done by sequentially checking each WAL entry in the last part file. A WAL entry is checked for corruption by first checking to make sure that the header contains the appropriate number of bytes, and then checking to see that the expected number of bytes after the header are present.
7. If none of the WAL entries are corrupt then the check is complete and normal processing can resume. If even one of the WAL entries are corrupt, then the WAL is repaired. In some implementations, only the last WAL entry in the WAL can be corrupt.
8. There are two cases for the corrupt WAL entry:
   a. If the corrupt WAL entry is the only entry in its respective part file, then the part file is deleted.
   b. If the corrupt WAL entry is not the only entry in its respective part file, then the corrupt WAL entry is truncated from its part file.
9. Now that the WAL is restored, normal processing is resumed.

Message Queue Input

In order for streaming microservices to provide exactly-once semantics, messages need to be consumed from a message queue idempotently. The definitions of idempotence and how they relate to the consumption of messages from a message queue are provided below:

General definition: In a general sense idempotence means that an operation will have the same effect, even when it is performed multiple times.

Message queue input definition: A streaming message queue input connector is idempotent when it consumes the same messages for a given processing window each time a processing window is executed. For example, consider a streaming message queue input connector, which consumed the following messages in the given processing windows:

| Processing Windows | Messages |
| --- | --- |
| Window 1 | 1, 2, 3 |
| Window 2 | 4, 5, 6 |

When this connector fails and replays windows 1 and 2, messages 1, 2, and 3 are consumed in window 1 again and messages 4, 5, and 6 are consumed in window 2 again.

In order to achieve idempotence in a message queue input connector, the message queue a connector is consuming from must have the properties described above. Additionally the message queue input connector must leverage the WAL described above. A high level description of how the WAL is leveraged in message consumption is provided below:

Normal Processing: During normal processing, the following interactions occur with the WAL.
1. A message queue input connector contains a WAL. This WAL is called the message queue offset WAL.
2. A message queue input connector is started and consumes messages from the message queue each processing window.
3. At the beginning of each processing window, the current message queue offset is recorded. This is the start queue offset.

4. At the end of each processing window, the current message queue offset is recorded. This is the end queue offset.
5. At the end of each processing window, the start queue offset and end queue offset are stored in the WAL.
6. Steps 3-5 are repeated.

Failure Processing: When a failure occurs, the following recovery steps are performed.
1. The message queue input connector is restored from a checkpoint by the streaming platform.
2. The message queue input connector starts running the first processing window after the recovery checkpoint.
3. At the beginning of each processing window, the WAL is checked to see if a start queue offset and end queue offset are already stored for that window. If the offsets are not stored in the WAL for that window, processing occurs normally as described in the Normal Processing section above. If the offsets are stored in the WAL for that window, then messages are consumed from the message queue starting at the start queue offset until the end queue offset is reached. Once the end queue offset is reached the message queue input connector simply waits for the next processing window.

Now we will move on to describe the details of a message queue output connector.

Message Queue Output

In order to enable streaming microservices to provided exactly-once semantics, we require a message queue connector that can write messages to a message queue exactly-once. Exactly-once output requires the following:

An idempotent upstream source of messages, like the message queue input connector described above.

The WAL implementation for idempotence described above.

A unique ID for each message sent to the message queue. The unique IDs can be supplied by an operator that is upstream to the message queue output connector. Let's call this id the message ID.

A high level description of how the above requirements are leveraged in the message queue output connector is provided below.

Normal Processing: During normal processing, the following interactions occur with the WAL.
1. A message queue output connector contains a WAL. This WAL is called the message queue offset WAL.
2. A message queue output connector is started and receives messages from an upstream operator each processing window.
3. In each processing window, the message queue output connector receives messages. Those messages are then sent to a topic of the desired message queue.
4. At the end of the processing window, the offset of the last message sent to the message queue is stored in the WAL. This offset is called the last sent offset. There are three cases for storing this data:
   a. If messages were sent to the message queue in this processing window, the offset of the last message sent to the message queue in this processing window is stored in the WAL.
   b. If no new messages were sent to the message queue in this processing window, the last sent offset of the previous processing window is stored in the WAL.
   c. If no messages were sent to the message queue by the message queue connector in any processing window, then a special no messages sent marker is saved in the WAL instead of a last sent offset.
5. Steps 3-4 are repeated.

Failure Processing: When a failure occurs, the following recovery steps are performed.
1. The message queue output connector is restored from a checkpoint by the streaming platform.
2. The message queue output connector starts running the first processing window after the recovery checkpoint.
3. At the beginning of each processing window, the WAL is checked to see if a last sent offset or no message marker is already stored for that window:
   a. Processing window with a stored offset: In this case, that the processing window has a stored offset and the message queue output connector has already sent the messages it has received from upstream operators to the message queue. Because the messages have already been sent, no additional messages are sent to the message queue in this processing window and the message queue output connector does nothing.
   b. Processing window with a no message marker: In this case, the message queue output connector did not send any messages to the message queue up to and including this processing window. As a result, the message queue output connector does not send anything to the message queue in this processing window.
   c. First processing window without a stored offset or no message marker: This is the case where the first processing window after recovery that does not have any data being stored in the WAL is being processed. This processing window is the processing window that was being executed by the message queue output connector immediately before it failed. When this processing window was being executed for the first time, the message queue output connector may have written some messages to the message queue, but did not successfully write the last message offset to the WAL before the failure. In order to handle this case, the following is done:
      1. The last sent offset or no message marker is retrieved for the previous processing window.
      2. If a last sent offset was stored for the previous processing window, all the messages in the message queue after the last sent offset are read from the message queue. If a no message marker was stored for the previous processing window, all the messages in the message queue are read. These messages are called the partial window messages.
      3. Any messages received by message queue output connector from an upstream operator are first checked to see if they are one of the partial window messages. This check is performed by using the unique message ID of each message. If the received message is one of the partial window messages, it is ignored. If the message is not one of the partial window messages, it is sent to the messages queue and the message is removed from the set of partial window messages.
      4. There are two cases for saving the last message offset at the end of a processing window:
         a. If any new messages (which were not one of the partial window messages) are sent to the message queue in this processing window, then the last message offset of the current processing window is saved in the WAL. Also, the set of partial window messages is cleared.
         b. If no new messages are sent to the message queue in this processing window, then the last message offset of the previous processing window or no message marker is saved in the WAL.
  d. Rest of the processing windows without data in the WAL: This case applies to all the processing windows after the first processing window without a stored offset or no message marker. This case has two subcases:
    1. The set of partial window messages is empty. In this case, normal processing can resume and steps 3-4 in the normal processing section above can be performed.
    2. The set of partial window messages is not empty. In this case, steps 3.c.3-3.c.4 above are repeated.

This concludes our discussion of the processing steps required to write messages to a message queue exactly-once.

Storing State in Streaming Microservices

In some implementations, the technology disclosed provides stateful microservices, such as the Streaming Data Aggregation Service (SDAS) discussed later in this application. Stateful refers to the phenomenon that the state of the operators that form a microservice increases with time.

As the state grows, the memory used by the operator grows. There are two problems with this. First, the amount of memory assigned to an operator is limited. Therefore, in a stateful operator, the memory needs to be managed; otherwise the microservice crashes. Second, time taken by checkpointing keeps on increasing and eventually the service fails.

To address these problems, the technology disclosed incrementally checkpoints key-value state. The discussion below describes the implementation of the disclosed WAL used for capturing incremental key-value state, the algorithm for incremental checkpointing, and a component called Incremental State. Incremental State encapsulates the WAL and the algorithm and can be added to an operator in a streaming application.

WAL Implementation for Incremental State

In addition to the log files in the WAL, mentioned above, this implementation of WAL has additional information associated with the WAL. This additional WAL state is checkpointed by the streaming platform.

WAL State

Figure 14:
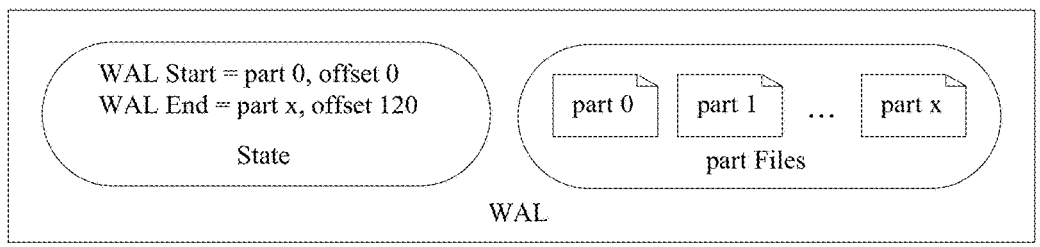
FIG. 14 depicts an example WAL state.

The additional WAL state comprises the start pointer and the end pointer. A pointer in the context of the WAL is a pair comprising a part file number and the offset in the corresponding part file. FIG. 14 depicts an example WAL state.

For example, the start pointer in FIG. 14 refers to offset 0 in part file 0 and the end pointer refers to offset 120 in part file x. The start pointer is offset 0 in part 0 when the WAL is first created and remains so until a checkpoint is committed for the first time. A more detailed description of how the start pointer is managed is provided later in this application.

The end pointer is recorded in order to make writing to the WAL fault-tolerant. Specifically, it is required to prevent duplicate entries from being written to the WAL. The details of how fault-tolerance is achieved in the WAL are discussed below.

Fault-Tolerance

The WAL files are written by the operator not the platform so it becomes the responsibility of the operator to take the necessary steps in order to avoid writing duplicate entries to this log. Duplicate entries are a possibility if the WAL is not pruned after a failure.

After a failure, an operator in a stream processing application is restored with the state of its previously saved checkpoint. The ID of this checkpoint is the activation window ID. The events after the activation window ID are then replayed to the operator for processing. However, in the previous run, the operator may have already accounted for these events by adding entries to the WAL. If the operator appends the same entries to the WAL for a replayed processing window, then those entries are duplicated. This is illustrated in FIG. 15.

Figure 15:
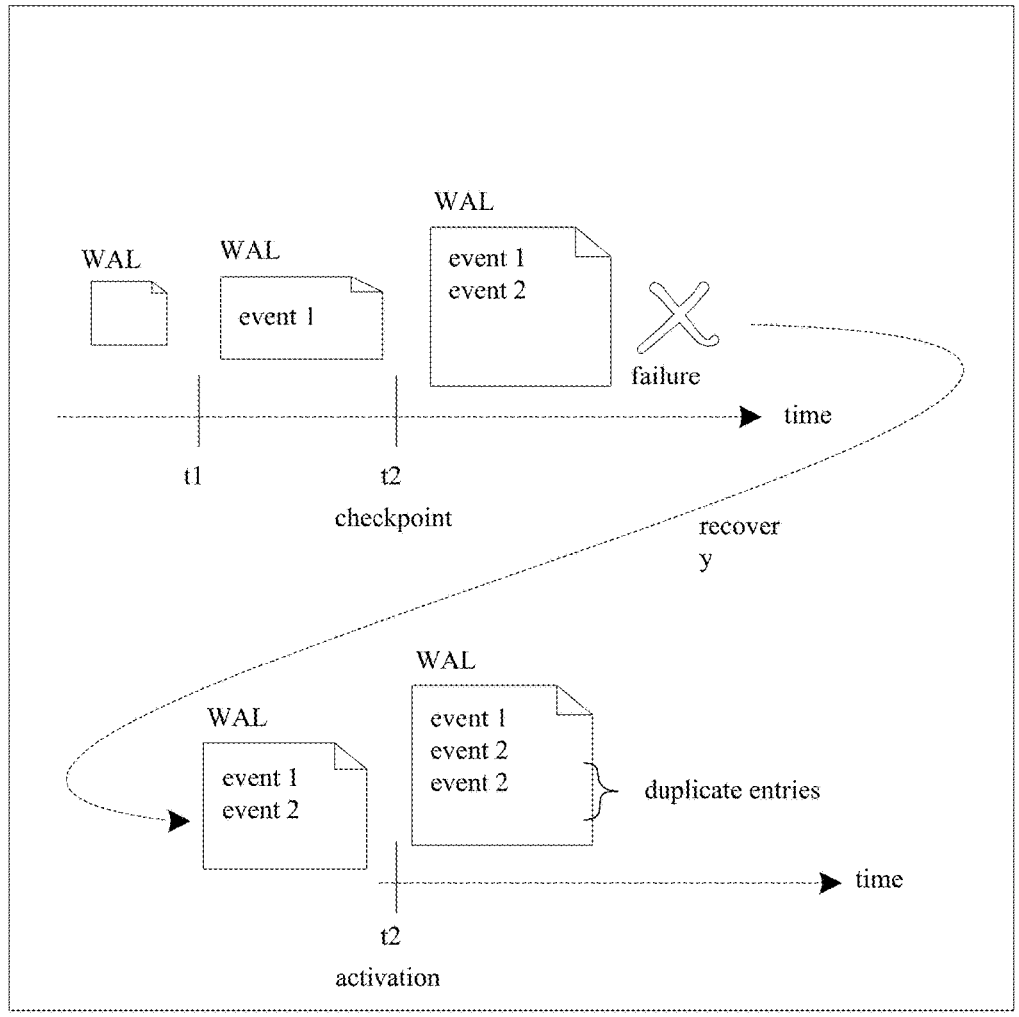
FIG. 15 illustrates one implementation of a replay mechanism used by the WAL to avoid data deduplication.

The following is a walkthrough of the example illustrated in FIG. 15:
1. In window t1, the operator receives event 1 and adds it to the WAL.
2. Then the operator is checkpointed before window t2.
3. The operator moves to window t2.
4. In window t2, the operator receives event 2 and adds it to the WAL.
5. Before window t2 completes, a failure occurs and operator crashes.
6. The disclosed stream processing engine restores the operator with its last checkpoint that was at the end of window t1.
7. The platform replays events window t2 to the operator.
8. The operator re-writes event 2 to the WAL creating a duplicate entry.

In order to avoid duplicates in the WAL, the WAL state is used to truncate the WAL during recovery. The state of the WAL is persisted by the streaming platform during a checkpoint.

Figure 16:
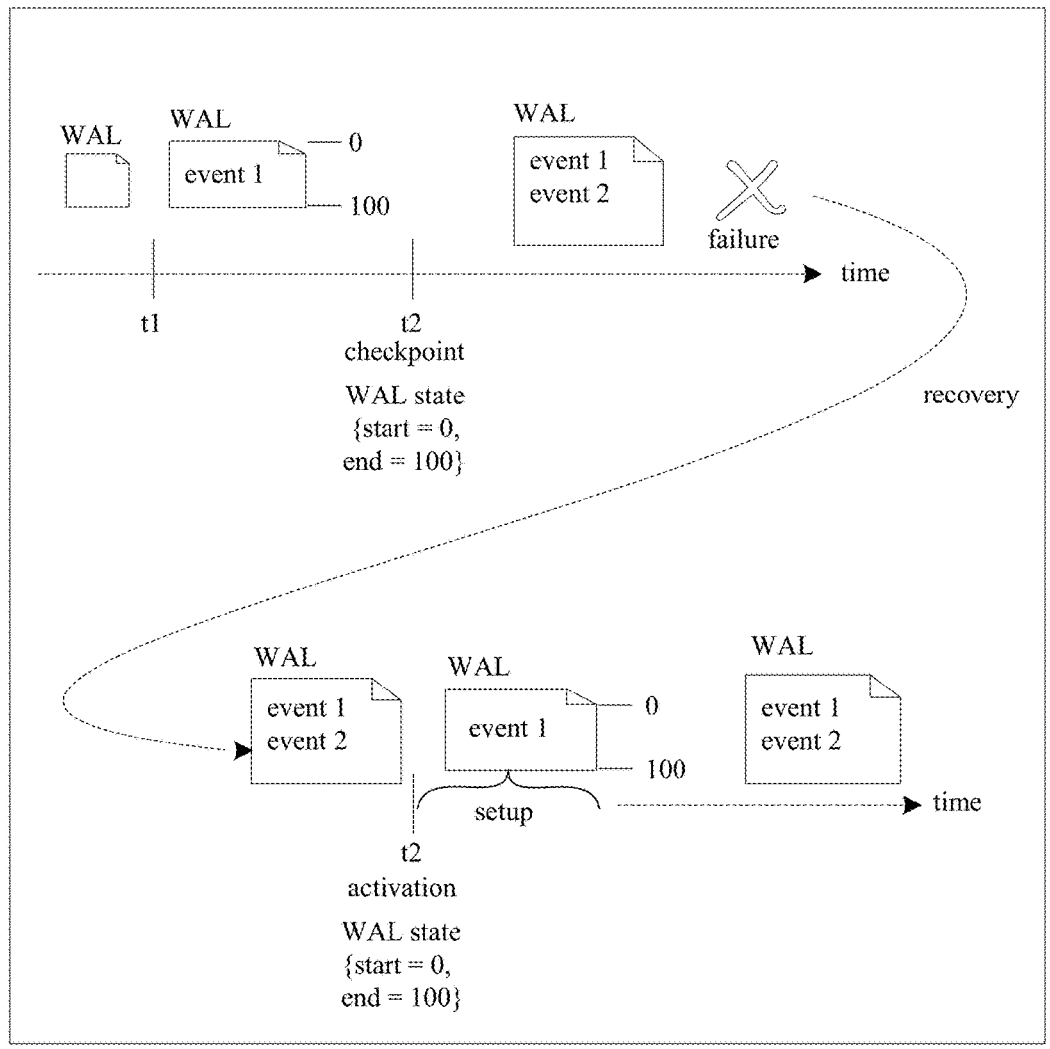
FIG. 16 shows one implementation of a deduplication mechanism used by the WAL to truncate the WAL during recovery.

This is illustrated in FIG. 16.

The following is a walkthrough of the example illustrated in FIG. 16:
1. In window t1, the operator receives event 1 and adds it to the WAL.
2. At the end of window t1 and before window t2, the operator gets checkpointed. The checkpoint includes the WAL start and end pointer. Here, we have simplified the example by assuming just one part file instead of multiple part files. So the start pointer is offset 0 and the end pointer is offset 100 in this example.
3. The operator moves to window t2.
4. In window t2, the operator receives event 2 and adds it to the WAL.
5. Before window t2 completes, a failure occurs and operator crashes.
6. The disclosed stream processing engine restores the operator with the state of its last checkpoint that was after window t1 and before window t2.
7. The end pointer of the WAL was 100 in the checkpoint. Since, the WAL currently has a length more than 100, it is truncated to length 100.
9. After the WAL is repaired, the operator is on window t2.
10. The events sent to the operator in window t2 are replayed.
11. The operator writes event 2 to the WAL and there are no duplicate entries the WAL.

Incremental State Algorithm

The disclosed incremental state algorithm provides a mechanism to: (1) store the changes in operator key-value state instead of the complete operator state during a checkpoint, (2) ability to efficiently query the value of a key from the operator's state, and (3) fault-tolerant with efficient recovery.

Firstly, key-value pairs and their corresponding timestamps are kept in memory until the beforeCheckpoint callback. In the beforeCheckpoint callback, all the key, value, and time triplets stored in memory are written to the WAL. However, searching for the value of a key from the WAL can be expensive. To be able to do lookups efficiently, data in the WAL that is not needed for recovery is moved to a data store.

The transfer of state from the WAL to the data store happens when a checkpoint gets committed. When a checkpoint gets committed, the state corresponding to that checkpoint will never be needed for recovery since all the operators in the application have completely processed the data up to and including that checkpoint. Therefore, all the data in the WAL up to and including the committed ID is transferred to a data store. This transfer happens asynchronously.

Walkthrough

Figure 17:
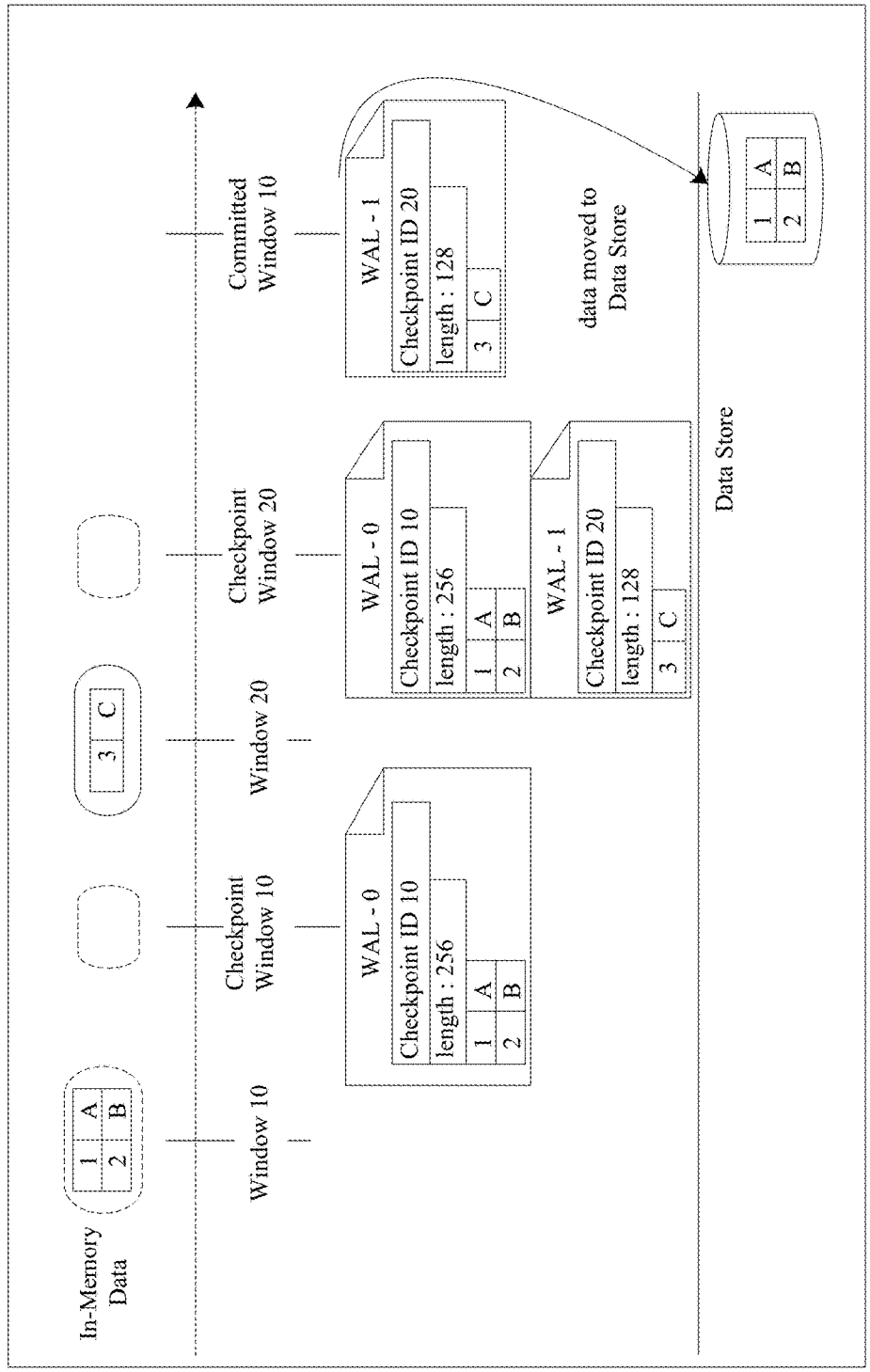
FIG. 17 illustrates the process of transferring data from memory, to the WAL, and then to the data store.

FIG. 17 illustrates the process of transferring data from memory, to the WAL, and then to the data store. The example illustrated in FIG. 17 assumes that the maximum length of a WAL part file is 256 bytes and that a checkpoint occurs every 10 processing windows.

The following is a walkthrough of the example illustrated in FIG. 17:

1. In any window between window 1 and window 10 inclusive, key-value pairs (1→A) and (2→B) are saved in memory with their associated timestamps.
2. At the end of window 10, the beforeCheckpoint callback is called for window 10.
3. All the key, value, and time triplets from memory are saved to part file WAL-0.
4. The checkpoint for window 10 is saved.
5. In any window between window 11 and window 20 inclusive, key-value pair (3→C) is saved in memory with its associated timestamp.
6. At the end of window 20, the beforeCheckpoint callback is called for window 20.
7. All the key, value, and time triplets from memory are saved to the WAL. Since part file WAL-0 has a length equal to the max length of 256 bytes, part file WAL-1 is created and the new triplets are appended to part file WAL-1.
8. The checkpoint for window 20 is saved.
9. Processing window 10 gets committed, WAL entries are read from the WAL beginning at the start pointer. WAL entries are read up to and including the WAL entry for window 10. The triplets from the selected WAL entries are stored in the data store. Then the part files which only contain WAL entries for committed processing windows are deleted. In this case, part file WAL-0 contains no WAL entries for processing windows after window 10, so it is deleted. Then the start pointer of the WAL is updated to point to the WAL entry of the first processing window after the committed window. So, in this case the start pointer is updated to part 1, offset 0.

Fault-Tolerance

The process described above is fault-tolerant, as discussed above.

Incremental State

Figure 18:
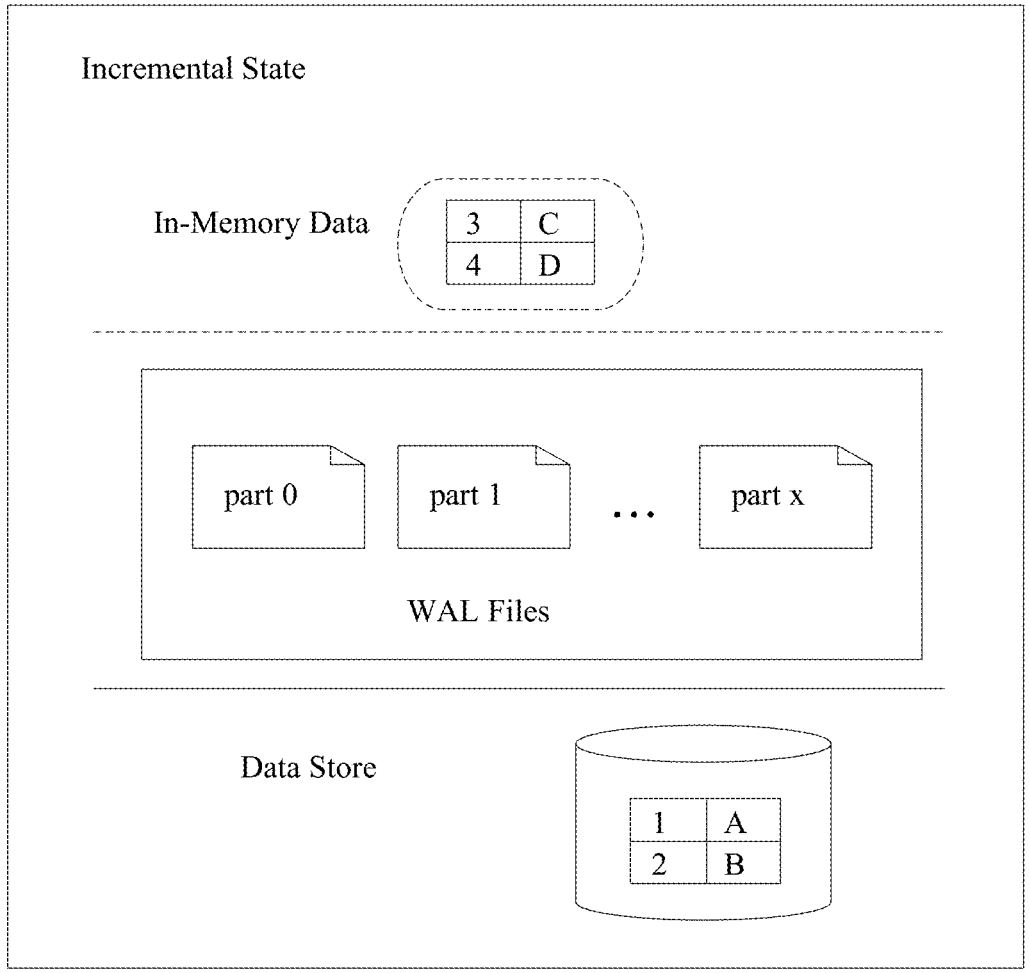
FIG. 18 depicts one implementation of incremental state.

Incremental State is a component that encapsulates key-value pairs stored in memory, the WAL, the data store, and the incremental state algorithm described above. This is illustrated in FIG. 18. Incremental State ties these components together to provide the following:

The processes of persisting key-value pairs, as described above with respect to FIG. 17.
Purging of old data.
Operations that allow a user to interact with key-value pairs.

The Incremental State operations that are available to a user and how they are implemented are described in the section below.

Operations

Incremental State allows the user to save, retrieve, and delete key-value pairs. The datatype of both keys and values in Incremental State is a sequence of bytes. The discussion below describes how each incremental state operation is implemented.

Save a key-value pair: This operation saves the key-value pair in memory. The key-value pair is then persisted using the algorithm described above.

Retrieve the value of a key: To find the value of a key, Incremental State performs the following steps:

a. Searches for the key in the memory and returns the value if the key exists.
b. If the key is not found in the memory, then it searches for the key in the WAL. The WAL part files are read in reverse order (youngest to the oldest) and each part file is read from its start to end to find the latest value for a key. If the key exists in a part file, then its latest value is returned. In some implementations, optimizations can be done to reduce the time to search for a key in the WAL, such as:
  Key-value pairs corresponding to each checkpoint are sorted by key in the WAL. If the first key in a checkpoint is greater than the key being searched, then rest of the key-value pairs in that checkpoint can be skipped.
  The WAL can have an LRU (Least Recently Used) cache.
c. If the key is not found in the WAL, then Incremental State searches for the key in data store. If the key exists there, then it returns its value. Otherwise, null is returned.

Incremental state offers two methods of retrieval:

Synchronous retrieval: This operation can be expensive because it blocks the caller until steps a-c above are executed.

Asynchronous retrieval: This operation is non-blocking. If the key exists in the memory, then a completed future is returned with the value. Otherwise, a pending future is returned. Incremental State will asynchronously execute steps a-c. After the value is discovered, the corresponding future is updated and completed.

Delete a key: When deleting a key, the key can be present either in the memory, the WAL, or the data store. To delete a key, following steps are taken:

1. A reserved byte array value that denotes deletion is saved corresponding to the key in the memory.
2. Nothing changes when writing the entries from the memory to the WAL. So, when a deleted key makes it to the WAL, it has the value denoting deletion.
3. When the data is transferred to the data store, then the value is checked to see if it indicates deletion. If it does, then the key is removed from the data store. This affects retrieval of a value from the Incremental State as well. If a key is found in the memory or the WAL, then its value is checked to see if it indicates deletion. If it does, then a null value is returned.

Purging Old Key-Value Pairs from Data Store Periodically

Purging is a process that continually removes data from a data store that is older than a specified time. This allows us to save storage space by removing data that will no longer be used. Purging is achieved by saving a timestamp with each key-value pair saved in a data store. In some implementations, the timestamp can either be the event time or the processing time. The process of storing the timestamp, key, and value triplet in a data store is the following:

1. The beforeCheckpoint callback is called. All the collected key-value pairs and their corresponding timestamps are serialized to bytes and written to the WAL.
2. The committed callback is called. Data is transferred from the WAL. Each timestamp, key, and value triplet is stored in the data store by simply storing the timestamp of a triplet in the time column of the data store, storing the key of a triplet in the key column, and storing the value of a triple in the value column.

The time at which data is purged from a data store is controlled by the purge duration. The purge duration defines the expiration time for key-value pair relative to the processing time of a processing window. For example, when the purge duration is 2 days, key-value pairs in the data store with a timestamp two days older than the processing time of the current processing window are removed from the data store. In some implementations, if the purge duration is infinite, then data will never be removed from the data store, and the purging process described below will not be executed.

The following describes the process of purging data older than a specified purge duration:

1. At configured regular intervals (e.g., 500 ms), Incremental State uses the purge duration and current time to compute the timestamp which represents the age of the oldest key-value pairs that will be retained. Let's call this the oldest retained timestamp.
2. Any key-value pair with a timestamp older than the oldest retained timestamp is deleted.

Data Store

Incremental State requires the data store to have the following properties:

1. Available and durable.
2. Ability to create indexes for a column.
3. Allow a sequence of bytes to be stored in a column.

Additionally when Incremental State first starts, it initializes the data store. The data store is initialized by:

Creating a data storage table with 3 columns: key, value, and time. The key and value columns store a sequence of bytes while the time column stores a timestamp.
Creating an index on the key column in the data storage table.
Creating an index on the time column in the data storage table.

Storage of Complex Data Structures

Many big data services require the storage of complex data structures that are too large to fit in memory. Typically, the storage of these data structures is done in an ad-hoc and use-case specific manner. However, the technology disclosed persists these data structures using the data storage layer described above using a framework referred to as "spillable data structures". The primary advantages of the disclosed spillable data structures are:

From a programmer's perspective, the disclosed spillable data structures are just as compatible and usable as other popular in-memory data structures.
The disclosed spillable data structures inherit all the fault-tolerance guarantees provided by our data storage layer described above.

The disclosed spillable data structures comprise several components. What follows is definitions of some high-level components.

Spillable Data Structure: A spillable data structure is a data structure that is automatically, flexibly, effectively, and efficiently spilled to disk in a fault-tolerant manner as it grows too big to fit into memory.

Backend Store: This is the layer that is used to persist the data managed by a spillable data structure. This layer is pluggable with the spillable data structures so that there are many possible places data stored by a spillable data structure can reside (e.g., Cassandra, HDFS, Amazon Elastic File System (EFS), SQL Database).

Spillable ID Generator: This is used to generate a unique identifier for each spillable data structure. These identifiers are used to allow the storage of multiple data structures within the same backend store.

Serializer: One or more serializers are set on a spillable data structure. Serializers are used to convert an in-memory object into an array of bytes.

Deserializer: One or more deserializers are set on a spillable data structure. Deserializers are used to convert a byte array representation of an object into a standard in-memory object.

Spillable Factory: This is responsible for creating spillable data structures for the programmer to use in their business logic. The factory sets the ID, serializers, deserializers, and backend store on a spillable data structure when it is created.

Figure 19:
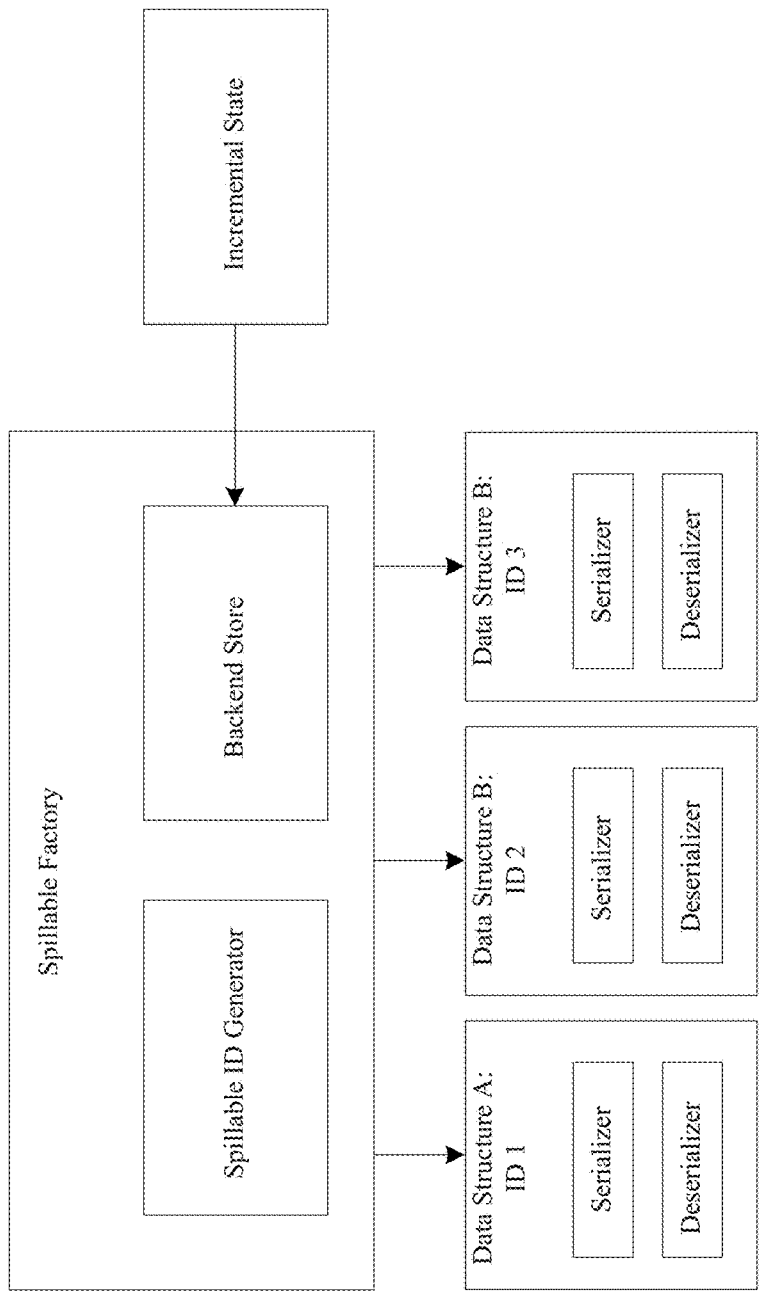
FIG. 19 shows one implementation of a spillable data structure architecture that implements the disclosed spillable data structures.

The following discussion explains how a programmer can interact with the disclosed spillable data structures and what each component in the architecture does during that interaction. FIG. 19 shows one implementation of a spillable data structure architecture that implements the disclosed spillable data structures.

1. The programmer instantiates an implementation of a spillable ID generator.
2. The programmer instantiates an implementation of a backend store. In some implementations, configuration of the backend store can be done as well, e.g., HDFS storage path, database credentials.
3. The programmer creates a spillable factory and configures it to use the previously created spillable ID generator and backend store.
4. Now the programmer is ready to create a spillable map. Spillable maps are described in more detail later in this application. The programmer creates a spillable map by calling the appropriate factory method on the spillable factory. The factory method for creating a spillable map receives the following information from the programmer:
   A serializer for the key object type. This is used to convert key objects in the spillable map into bytes.
   A deserializer for the key object type. This is used to convert the byte sequences corresponding to keys into in memory objects.
   A serializer for the value object type.
   A deserializer for the value object type.
5. After the programmer calls the factory method to create a spillable map, the following steps are executed:
   The spillable ID generator is used to create a unique ID for the new spillable map being constructed.
   The new spillable map is instantiated and configured with its unique ID. It is also given a reference to the backend store for persisting its data.
6. Now the factory method returns a spillable map to the programmer.
7. When the programmer puts a key-value pair into the spillable map, the key and value are serialized using their respective serializers. The bytes for the key and value are then stored in the configured backend store.

The original key and value objects are also cached in memory to improve performance of frequent accesses.

8. When the programmer gets the value for a key, the following happens:

The internal in-memory cache of the spillable map is first checked.

If the value for the specified key is in the cache, then the value is returned.

If the value for the specified key is not in the cache, then the key is converted to bytes using the key's serializer.

The key bytes are then used to look up the value bytes in the backend store.

Once the value bytes are retrieved, they are converted to an in memory object by using the value's deserializer.

Then, the value object is returned to the programmer.

In some implementations, additional data structures are created and manipulated in a similar fashion.

Simultaneous Storage of Multiple Data Structures

The following discussion describes how the technology disclosed simultaneously stores multiple data structures in a backend store.

Figure 20:
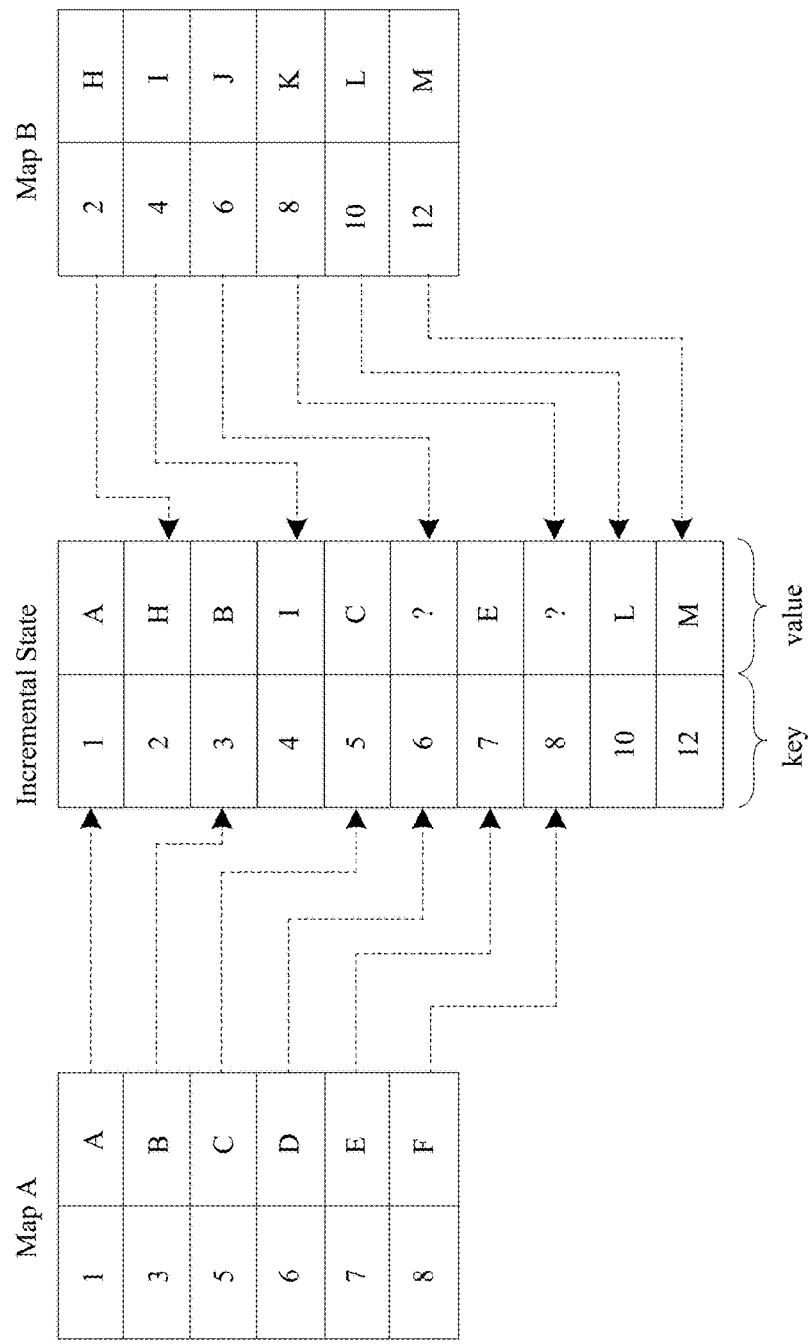
FIG. 20 shows the technical problem that with simultaneous storage of multiple data structures that the technology disclosed solves.

If one naively attempts to store multiple data structures in the same backend store, logical errors can arise. For example, if we have two maps, Map A and Map B, which are both attempting to store different values for the keys 6 and 8 in the same backend store, the value stored for the two keys is undefined, as illustrated in FIG. 20.

The technology disclosed simultaneously stores multiple data structures in the same backend store by using the unique ID assigned to each data structure. The IDs assigned to each spillable data structure are byte sequences. The byte sequence identifier for each data structure comprises the same number of bytes, so it can be attached as a prefix to each key stored in the backend store by each spillable data structure. This key-prefixing guarantees isolation between multiple spillable data structures stored in the same backend store. The details of how this isolation is achieved is described in more detail with the following example.

1. Consider the case where we have two spillable data structures, DS A and DS B, backed by the same backend store.
2. Let's say DS A has an ID of 0x01 and DS B has an ID of 0x02.
3. Let's say DS A needs to store the key 0xBEEF with a value 0xDEAD and DS B needs to store the key 0xBEEF with a value 0xAAAA.
4. When DS A persists the key-value pair (0xBEEF, 0xDEAD) the key 0xBEEF is first prefixed with DS A's id 0x01. So the key-value pair that is persisted in the backend store is (0x01BEEF, 0xDEAD).
5. Similarly when DS B persists the key-value pair (0xBEEF, 0xAAAA) the key 0xBEEF is first prefixed with DS B's id 0x02. So, the key-value pair that is persisted in the backend store is (0x02BEEF, 0xAAAA).

In some implementations, the key-prefixing functions as a namespace and prevents multiple spillable data structures from manipulating the same fully qualified keys in the same backend store.

Spillable Maps

Figure 21:
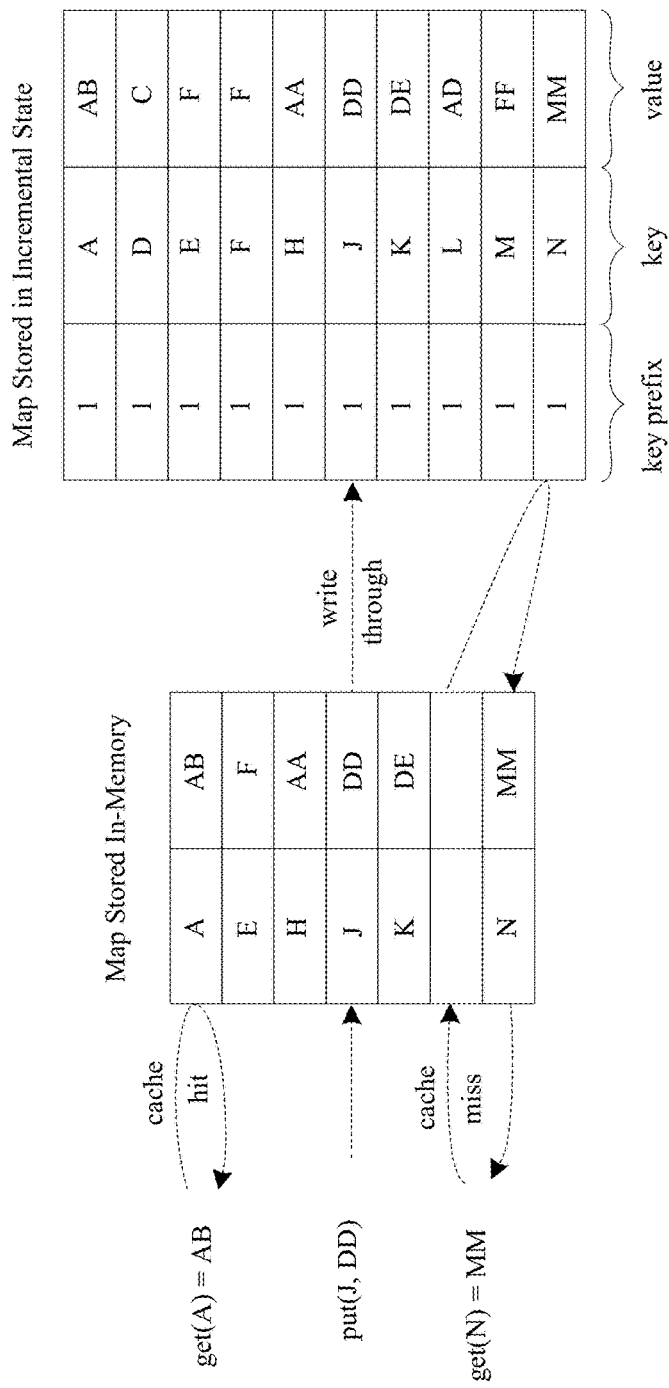
FIG. 21 depicts one implementation of how the disclosed spillable map data structure persists key-value pairs.

The disclosed spillable map data structure allows programmers to create and interact with maps that are too big to fit in-memory in a way that is similar to standard in-memory maps. As the programmer interacts with a spillable map, key-value pairs are persisted into a backend store. The way in which these key-value pairs are persisted is illustrated in FIG. 21.

Put: When a key-value pair is put into a spillable map, the following happens (as shown in FIG. 21):

1. The cache is updated with the new key-value pair.
2. The key serializer is used to convert the key object into a byte sequence.
3. The value serializer is used to convert the value object into a byte sequence.
4. The key byte array is prefixed with the unique byte array identifier assigned to the spillable map.
5. The prefixed-key byte sequence and the value byte sequence are put into the backend store that was configured on the spillable data structures framework.

Get: When a value for a key is retrieved from a spillable map, the following happens (as shown in FIG. 21):

1. The cache is checked. If a value for the key is in the cache, then it is returned and the Get operation is complete.
2. If a value for the key is not in the cache, then the key serializer is used to convert the key object into a byte sequence.
3. The key byte sequence is prefixed with the unique byte sequence identifier assigned to the spillable map.
4. The prefixed-key byte sequence is used to look-up the corresponding value byte sequence in the backend store.
5. The value byte sequence retrieved from the backend store is converted to an in-memory object by using the value deserializer.
6. The provided key and retrieved value are inserted into the spillable map's cache.
7. The value object is returned to the programmer.

Spillable Array Lists

The spillable array list data structure allows programmers to create and interact with array lists that are too big to fit in-memory in a way that is similar to standard in-memory array lists. The architecture used to persist a spillable array list is described below.

Persistence Architecture

The implementation of a spillable array list requires a spillable map, as shown in FIG. 22. The spillable map holds the contents of the array list by making the array indices keys and the values at those indices values in the map. In some implementations, this architecture only allows appends to the spillable array lists and deletions of elements at the end of the list.

Having described how a spillable array list is persisted, the discussion now turns to how a programmer uses it. A programmer can create a spillable array list using the steps described above vis-à-vis the creation of a spillable map. The following describes how the add, get, and removeLast operations, which are available to the programmer, are implemented.

Manipulation of a Spillable Array List:

Add: This operation appends an element to the end of the array list, as follows:

1. The programmer issues an instruction to add an element to the list.
2. The current size of the array list is retrieved.
3. The current size (key) and the element (value) are inserted into the internal map. This inserts the element at the last index of the array list.
4. The size is incremented.

Get: This operation gets an element in the list that is stored at a specified index.

1. The programmer issues an instruction to get an element at an index.
2. The value for the index (key) is looked up in the array list's internal spillable map.
3. The value is returned to the programmer.

RemoveLast: This operation removes the last N>0 elements from the list.
1. If the list is empty, then the process terminates.
2. The last element is removed from the list.
3. If N elements are removed, then the process terminates.
4. Steps 1-3 are repeated.

Spillable Heaps

The disclosed spillable heap data structure allows programmers to create and interact with heaps that are too big to fit in-memory in a way that is similar to standard in-memory heaps. The architecture used to persist a spillable heap is described below.

Persistence Architecture

Figure 23:
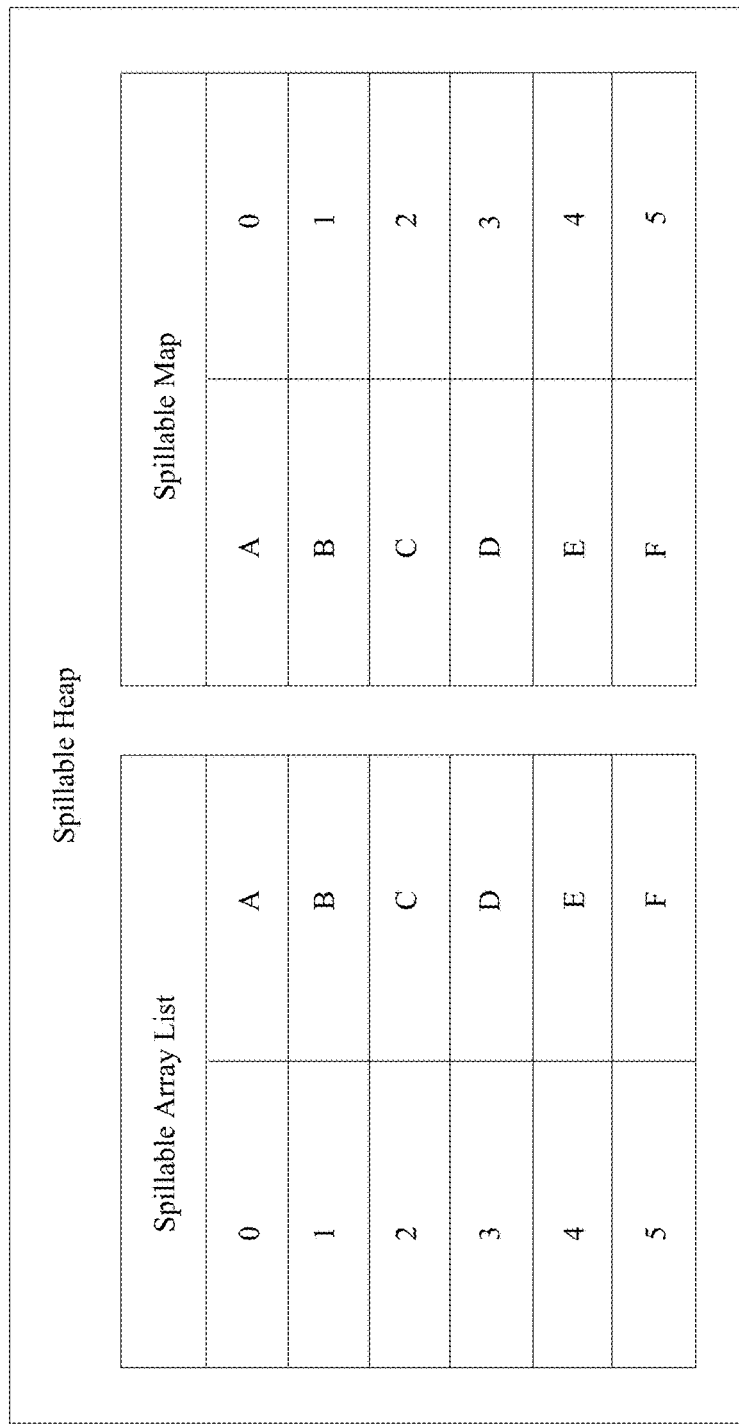
FIG. 23 depicts one implementation of a spillable heap using the disclosed spillable array list and the spillable map.

The implementation of a spillable heap requires a spillable array list and a spillable map, as shown in FIG. 23. The spillable array list functions as an array and implements array-based heap algorithms. The spillable map maintains the mapping from an element to the index it's currently stored at. This mapping is used to remove elements from the heap. Additionally, whether the spillable heap is a minimum or a maximum heap is determined by the comparator that is provided at the time the spillable heap is created. The spillable heap follows the convention that the smaller elements, as determined by the comparator, come first.

Persistence Walk-through

A programmer creates a spillable heap using the steps described above vis-à-vis the creation of a spillable map. The following describes how the peek, pop, remove, add, and contains operations, which are available to the programmer, are implemented.

Manipulation of a Spillable Heap:
Peek: This operation retrieves the element at the top of the heap, without removing it from the heap.
Empty Heap: This operation returns a null.
Non-empty Heap: This operation returns the element stored at index 0 of the heap's internal spillable array list.

Pop: This operation retrieves the element at the top of the heap and removes it from the heap.
Empty Heap: This operation returns a null.
Single Element Heap:
1. The element at index 0 in the spillable array list is retrieved. Let's call this the result element.
2. The single element is removed from the heap's internal spillable ArrayList.
3. The key-value pair for the element is removed from the heap's internal spillable map.
4. The result element is returned.

Multiple Element Heap:
1. The first element in the heap's internal spillable array list is retrieved. Let's call this the result element.
2. The first element in the heap's internal spillable array list is removed, using the process described in the Remove section below.
3. The result element is returned.

Remove: This operation removes a provided element from the spillable heap.
Empty Heap: Nothing is done.
Heap does not Contain Element: Nothing is done.
Heap Contains Element
Single Element Heap:
1. The element is removed from the heap's internal spillable map and spillable array list.
Multiple Element Heap:
1. The index for the element is found by looking up the index value corresponding to the element in the heap's internal spillable map. Let's call this index the hole index.
2. Remove the element from the heap's internal spillable map.
3. Get the last element in the heap's internal spillable ArrayList. Let's call this the percolation element.
4. Remove the last element from the heap's internal spillable ArrayList.
5. The percolate down algorithm is applied using the hole index and the percolation element.
6. If an element's index in the heap's spillable array list is changed by the percolate down algorithm, then update the element's index value in the heap's internal spillable map with the element's new index.

Add: This operation adds an element to a spillable heap.
Empty Heap:
1. The element is inserted as the first element in the heap's internal spillable ArrayList.
2. The element (key) and the element's index of 0 (value) are inserted as a key-value pair into the heap's internal spillable map.
Multiple Element Heap:
1. The element is appended to the end of the heap's internal spillable array list.
2. The element (key) and it's index in the heap's internal spillable array list (value) are inserted as a key-value pair into the heap's internal spillable map.
3. The standard percolate up algorithm is applied using the element that was just appended to the end of the heap's internal spillable array list.
4. If an element's index in the heap's spillable array list is changed, by the percolate up algorithm, then update the element's index value in the heap's internal spillable map with the element's new index.

Contains: This operation checks to see if the spillable heap contains a provided element.
Empty Heap: False is returned for any element.
Non-empty Heap:
1. The index for the provided element is looked up in the heap's internal spillable map.
2. If no index value for the element is found in the spillable map, then false is returned. Otherwise true is returned.

Spillable Expiration Manager

The spillable expiration manager allows programmers to store elements with a time stamp. The elements can be removed from the expiration manager in order of oldest to youngest stamp. This data structure useful for tracking events that have an expiration time. It is spilled to disk for the programmer, and the programmer interacts with the expiration manager in the same way that they would interact with an in-memory data structure.

Persistence Architecture

Figure 24:
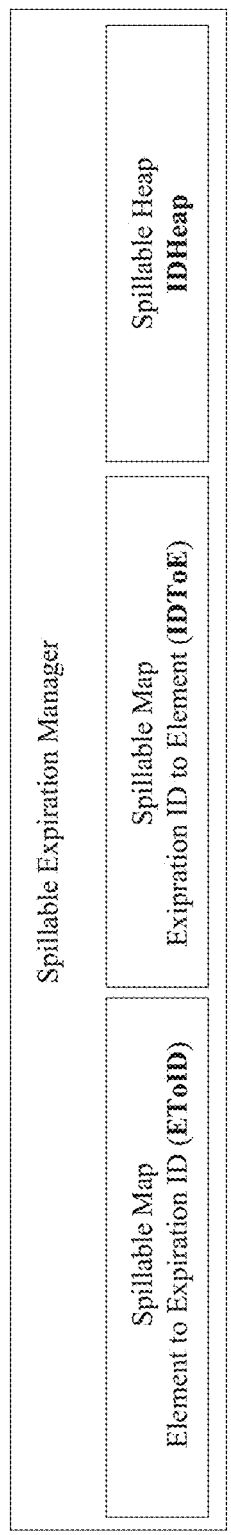
FIG. 24 illustrates one implementation a spillable expiration manager that uses two spillable maps (EToID and IDToE), and a spillable heap (IDHeap).

The implementation of a spillable expiration manager uses two spillable maps (EToID and IDToE), and a spillable heap (IDHeap), as shown in FIG. 24. The function of the disclosed spillable data structures, according to one implementation, is described below:

Elements: These are the elements that are expired.

Expiration ID: The expiration ID is used to track when a particular element is expired. The expiration ID contains the following information:

The timestamp of the element corresponding to this expiration ID. The timestamp in this case is the processing time (unix milliseconds epoch time) of the event.

The expiration duration of the element corresponding to the expiration ID. The expiration duration is the amount of time an element has after its timestamp, after which it expires.

A sequence ID assigned to the element corresponding to this expiration ID.

The expiration IDs are ordered by the following metric: timestamp+expiration duration.

EToID: This is a spillable map that maps elements (keys) to expiration IDs (values).

IDToE: This is a spillable map that maps expiration IDs (keys) to elements (values).

IDHeap: This is a spillable heap that orders expiration IDs in ascending order.

ProcessingTimeCalculator: This is used to get the timestamp at which an element was received.

Persistence Walk-Through

A programmer creates a spillable expiration manager using the steps described above vis-à-vis the creation of a spillable map. The following describes how the peek, pop, remove, and upsert operations, which are available to the programmer, are implemented.

Manipulation of a Spillable Expiration Manager:

Peek: This operation gives the first element to expire, without removing it from the expiration manager.

A peek is performed on the IDHeap to obtain the first expiration ID.

The current processing time is obtained from the processingTimeCalculator.

The current processing time is used to check if the first expiration ID is expired. If it is not expired, null is returned. If it is expired, then the following steps are followed:

The first expiration ID is then used as a key to look up the first element to expire in the IDToE map.

The first element to expire is returned.

Pop: This operation gives the first element to expire, and removes it from the expiration manager.

A pop is performed on the IDHeap to obtain the first expiration ID.

The current processing time is obtained from the processingTimeCalculator.

The current processing time is used to check if the first expiration ID is expired. If it is not expired, null is returned. If it is expired, then the following steps are followed.

The first expiration ID is then used as a key to look up the first element to expire in the IDToE map.

The first expiration ID is then removed from the IDToE map.

The first element to expire is then removed from the EToID map.

The first element to expire is returned.

Upsert: This operation adds a given element to the expiration manager with a given expiration duration. The expiration duration defines the number of milliseconds that need to pass after an element is upserted before it expires.

The element is removed from the expiration manager if it is already present in the expiration manager.

A sequence ID is generated for the given element.

The current timestamp is retrieved from the processingTimeCalculator.

A new expiration ID is constructed for the element using the current timestamp, sequence ID, and expiration duration.

The element (key) and new expiration ID (value) are inserted into the EToID map.

The new expiration ID (key) and element (value) are inserted into the IDToE map.

The new expiration ID is inserted into the IDHeap.

Remove: This operation removes the given element from the expiration manager.

The expiration ID for the element is looked up in EToID by using the element as a key.

The element is removed from EToID.

The expiration ID is removed from IDToE.

The expiration ID is removed from the IDHeap.

Streaming Analytics Microservices

The technology disclosed has multiple data processing services built on top of a stream processing engine. For each of the services, we describe below the target use case, some terminology, how users interact with it, how the service process data at a high level, and then the low-level implementation details.

Streaming Data Aggregation

The technology disclosed has a highly performant Streaming Data Aggregation Service (SDAS).

Target Use Cases

The target use case for our SDAS is to allow users to aggregate metrics for entities over time. Some, but not all, of the possible applications for the SDAS are listed below:

Aggregating credit card transaction history by category.

Performance monitoring of software.

Performance and health monitoring of physical assets.

Aggregation of digital advertisement click campaigns and views.

Aggregation of software user interface usage metrics.

Creation of feature vectors for use by machine learning algorithms.

Marketing data collection.

Monitoring of power grids.

Terminology

The following sections present an explanation of the terminology and a list of vocabulary.

Explanation

A tuple processed by SDAS contains dimensions and measures. Measures are the pieces of information we want to collect aggregations and statistics for. Dimensions are the variables that are used to group our measures together when computing aggregations and statistics. From the user's perspective, the tuples received by each instance of the SDAS contain the same dimensions and measures. Note however, that the value for each dimension and measure may vary across tuples.

The SDAS produces aggregations of incoming measures using aggregators. Aggregators are commutative and associative operations that are performed on measures. An aggregation is kept for each unique dimension combination. A dimension combination is a set of dimensions with a particular value for each dimension.

Given this terminology, we can describe the flow of data through the Streaming Data Aggregation Service as follows:
1. A tuple is sent to the SDAS.
2. This tuple has dimensions and measures.
3. The dimensions of the tuple are examined, and compared against dimension combinations we want to perform aggregations for.
4. We take a note of the dimension combinations that matched our tuple.
5. The measures of the tuple are combined with the aggregations kept for each matching dimension combination using an aggregator.

Vocabulary List

A list of the definitions described above are provided below for easy reference:
Tuple: A discrete unit of information which contains dimensions and measures.
Dimensions: The variables that are used to group our measures together when computing aggregations and statistics.
Measures: The pieces of information we want to collect aggregations and statistics for.
Aggregators: Are commutative and associative operations that are performed on measures.
Dimension combination: A set of dimensions with a particular value for each dimension.

Working Example

Now, we present an example for the Streaming Data Aggregation Service below:
Data Definition
An example use case for the Streaming Data Aggregation Service can be found in a hypothetical digital advertiser who is tracking the number of views, and clicks for advertisements published by a variety of customers in different locations. Please note that this is just one possible specific example. The service can be configured to handle a broad range of data and perform a variety of aggregations. How the user can configure the service will be discussed in more detail in section titled User Configuration.

Let's say our digital advertiser is processing tuples with the following information:
customer: The Id of the customer who is using the digital advertising service.
advertisement: The Id of the advertisement being displayed for a particular customer.
location: The location where an advertisement is being displayed.
time: The time at which any interaction with the advertisement happens.
clicks: The number of clicks an advertisement received.
views: The number of views an advertisement received.
These tuples have dimensions and measures as defined below:
Dimensions:
  customer
  advertisement
  location
  timestamp
Measures:
  clicks
  views Let's say our digital advertiser wants to compute the total number of clicks and views in the following scenarios:

1. Every minute for each unique customer.
2. Every minute for each unique customer and advertisement combination.
3. Every hour for each unique customer and location combination.
4. Every hour for each unique customer, advertisement, and location combination.

These four scenarios are synonymous with these dimension combinations:
1. customer, 1 minute time bucket
2. customer, advertisement, 1 minute time bucket
3. customer, location, 1 hour time bucket
4. customer, advertisement, location, 1 hour time bucket For each of these dimension combinations we are using the SUM aggregator to compute the totals for clicks and views.

Computation Walkthrough

Figure 25:
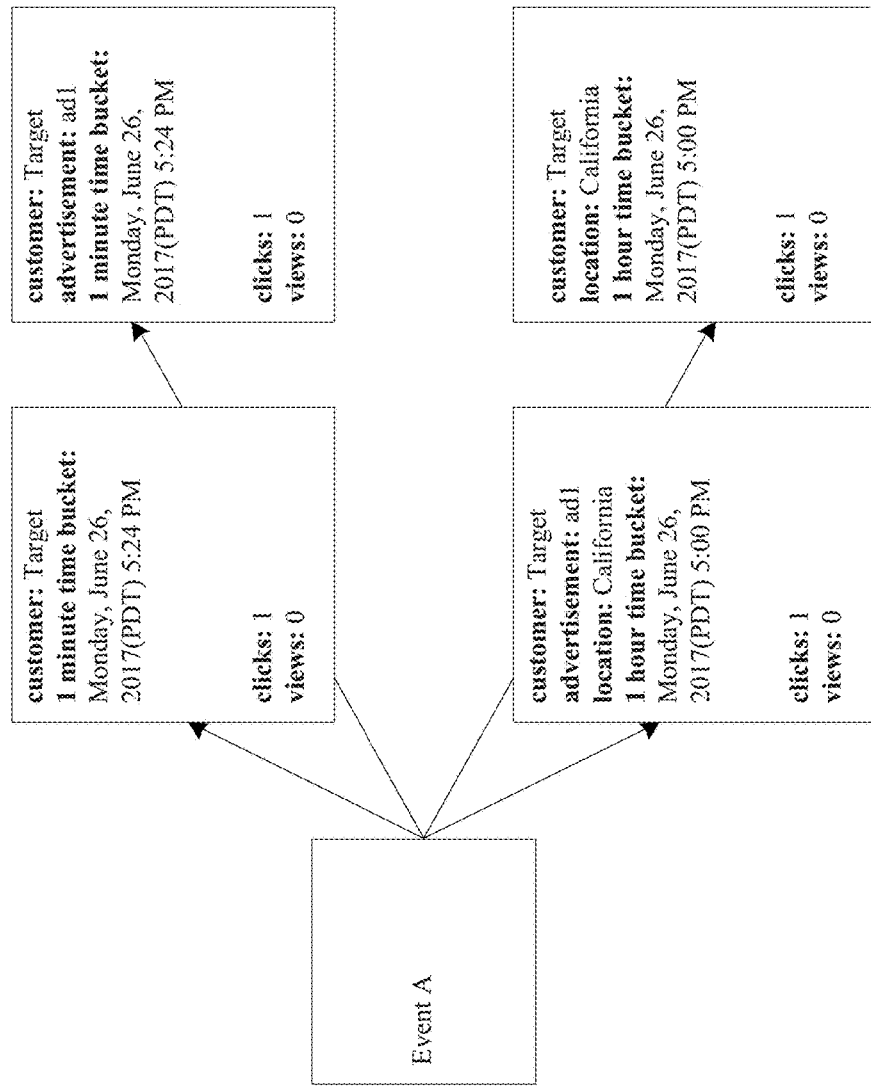
FIG. 25 shows how Event A is aggregated with the sums stored for each extracted dimension combination.

Now that we have defined what the data looks like in this example, we will walk through how the SDAS processes this data.
1. When a user interacts with an ad, one of two types of events can be generated.
   Click: In the event of a click, the digital advertiser sends an event (let's call this Event A) to the disclosed SDAS that looks like the following:
   {
   "customer": "Target",
   "advertisement": "ad1",
   "location": "California",
   "time": "Monday, Jun. 26, 2017 (PDT) 5:24 PM",
   "clicks": "1",
   "views": "0"
   }
   View: In the event of a view, the digital advertiser sends an event (let's call this Event B) to the disclosed SDAS looks like the following:
   {
   "customer": "Target",
   "advertisement": "ad2",
   "location": "California",
   "time": "Monday, Jun. 26, 2017 (PDT) 5:55 PM",
   "clicks": "0",
   "views": "1"
   }
2. Let's assume the SDAS just received Event A.
3. The SDAS then extracts the four desired dimension combinations from Event A:
   1. Target, "Monday, Jun. 26, 2017 (PDT) 5:24 PM"
   2. Target, ad1, "Monday, Jun. 26, 2017 (PDT) 5:24 PM"
   3. Target, California, "Monday, Jun. 26, 2017 (PDT) 5:00 PM"
   4. Target, ad1, California, "Monday, Jun. 26, 2017 (PDT) 5:00 PM"
4. Each dimension combination is a key that is used to look up the current SUM value for clicks and views. When Event A is processed, the values for clicks and views in Event A are combined with the SUM that is stored for each dimension combination (since Event A is the first event the SUMs are implicitly 0). FIG. 25 shows how Event A is aggregated with the sums stored for each extracted dimension combination.

Now let's send Event B to the SDAS. The SDAS then extracts the four desired dimension combinations from Event B:
1. Target, "Monday, Jun. 26, 2017 (PDT) 5:55 PM"
2. Target, ad2, "Monday, Jun. 26, 2017 (PDT) 5:55 PM"

3. Target, California, "Monday, Jun. 26, 2017 (PDT) 5:00 PM"
4. Target, ad2, California, "Monday, Jun. 26, 2017 (PDT) 5:00 PM"

Figure 26:
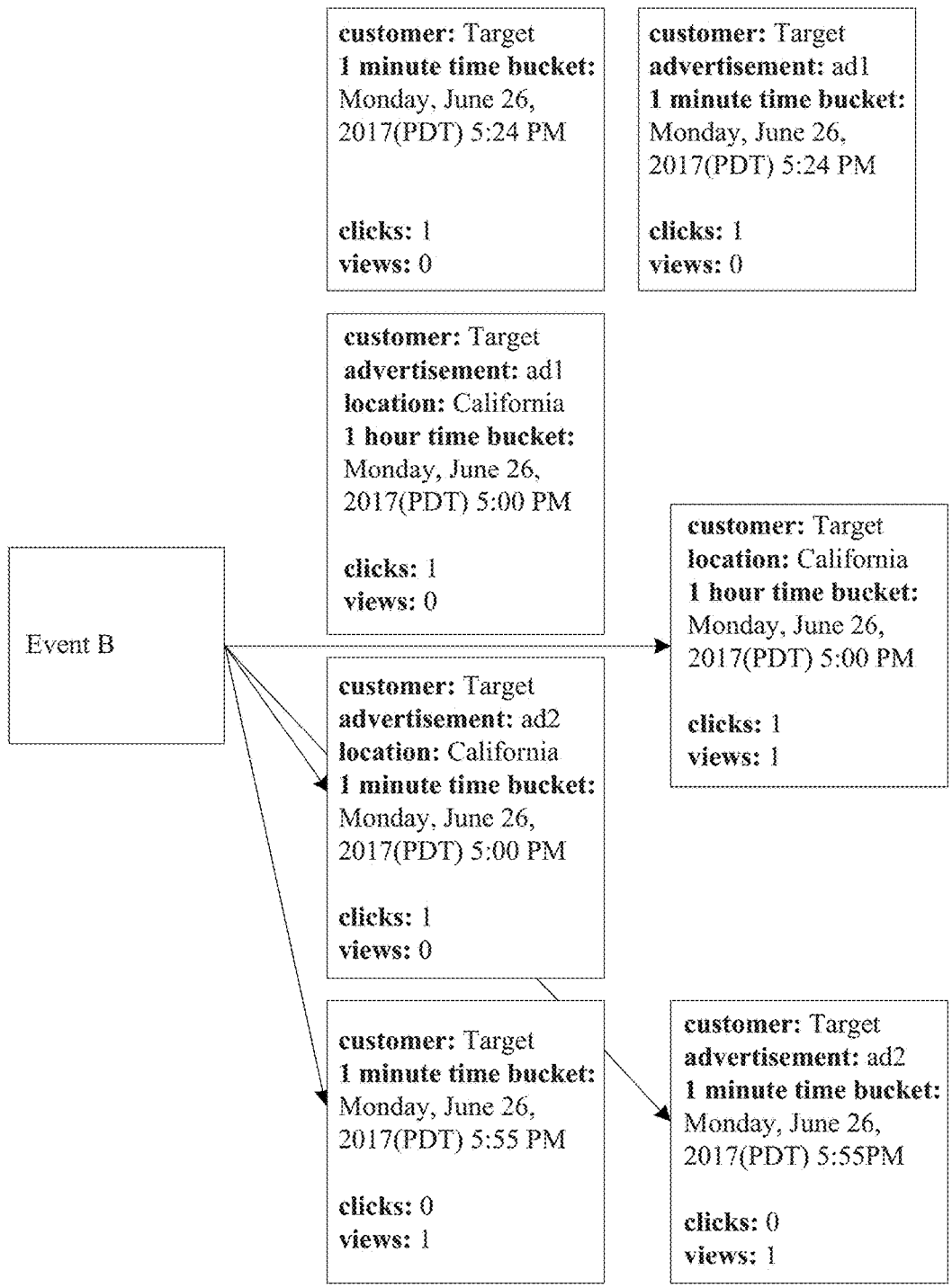
FIG. 26 shows how Event B is aggregated with the sums stored for each extracted dimension combination.

Each dimension combination is a key that is used to look up the current SUM value for clicks and views. When Event B is processed, the values for clicks and views in Event B are combined with the SUM that is stored for each dimension combination. FIG. 26 shows how Event B is aggregated with the sums stored for each extracted dimension combination. In some implementations, sums stored under dimension combinations that do not match Event B are unaffected.

Processing of additional events is done in the same manner as Event A and Event B.

User Configuration

The following section outlines the options that the user has to configure the SDAS to handle a variety of event tuples and aggregation requirements One implementation of the configuration options available to the user are described by the following JSON object. The configuration options are collectively called the Aggregation Schema:
{
"keys": [
{
  "name": "keyname1",
  "type": "string",
  "enumValues": ["value1"]
}
],
"timeBuckets": ["1m", "1h", "1d"],
"values": [
{
  "name":
  "impressions",
  "type": "long",
  "aggregators": ["SUM", "COUNT"]
}
],
"groups": [
{
  "combination": ["keyname1", "keyname2"],
  "additional Values": ["impressions:MIN", "clicks: MIN"],
  "timeBuckets": ["3s"]
}
]
}

Now, we explain what each component in the configuration is:
keys:
  Required: true
  Type: Non-empty array
  What: This specifies all the dimensions to be extracted from event tuples and used in dimension combinations.
keys element:
  Type: Object
  What: This is an element in the keys array. It specifies the name and type for a particular dimension.
  Sub Fields:
    name:
      Required: true
      Type: String
      What: The field name of a dimension in incoming event tuples.
    type:
      Required: true
      Type: String
      What: The data type of a dimension, e.g., string, double.
timeBuckets:
  Required: false
  Type: Non-empty array
  What: This specifies the time buckets to use with each combination in the groups section described below. The time buckets are defined with a special syntax:
    Ns: Defines a time bucket of length N seconds. E.x. "10s" is a time bucket of length 10 seconds.
    Nm: Defines a time bucket of length N minutes.
    Nh: Defines a time bucket of length N hours.
    Nd: Defines a time bucket of length N days.
values:
  Required: true
  Type: Non-empty array
  What: This specifies the measures to be extracted from event tuples and used in dimension combinations.
values element:
  Type: Object
  What: This is an element in the values array. It specifies the name and type for a particular measure.
  Sub Fields:
    name:
      Required: true
      Type: String
      What: The field name of the measure in incoming event tuples.
    type:
      Required: true
      Type: String
      What: The data type of a value e.g.: string, double.
    aggregators:
      Required: true
      Type: Array of strings
      What: This is a list of the names of the aggregators that are used to aggregate this measure for each dimension combination.
groups:
  Required: false
  Type: Non-empty array
  What: This specifies the combinations of dimensions to be extracted from event tuples and used in dimension combinations.
groups element:
  Type: Object
  What: This specifies the combination of dimensions to extract from event tuples. A combination is used to define a dimension combination by doing the following:
    1. The set of time buckets defined in the timebuckets section above is combined with the set of time buckets defined in the timeBuckets section for the groups element. Let's call this the Super Set of Time Buckets (SSTB).
    2. The cartesian product between the SSTB and a combination is taken to produce a set of dimension combinations.
  Sub Fields:
    combination:
      Required: true
      Type: Array of strings
      What: The field names of the dimensions to include in this combination.

additionalValues:
  Required: false
  Type: Array of strings
  What: This is a list of measure and aggregator pairs. Each pair has the form "<measure name>:<aggregator name>" and defines an aggregation that needs to be performed on a particular measure. An example of a valid pair is: "clicks:SUM"; this pair says to perform a sum of clicks. Each aggregation measure pair is only executed for the dimension combinations that are derived from this combination.
timeBuckets:
  Required: false
  Type: Array of strings
  What: This specifies the time buckets to associate with only this combination. The strings in this array follow the same format as the previous timebuckets configuration. And this set of time buckets is combined with time buckets defined in the previous timebuckets section described above to form the SSTB (as described above). Then the Cartesian product between the SSTB and this combination is taken to create all the dimension combinations associated with this combination.

The user can configure SDAS using a JSON text blob of the form described above. Or the user can interact with a UI to configure the service.

Implementation Details

One implementation of the physical implementation of the SDAS service is described here.

Figure 27:
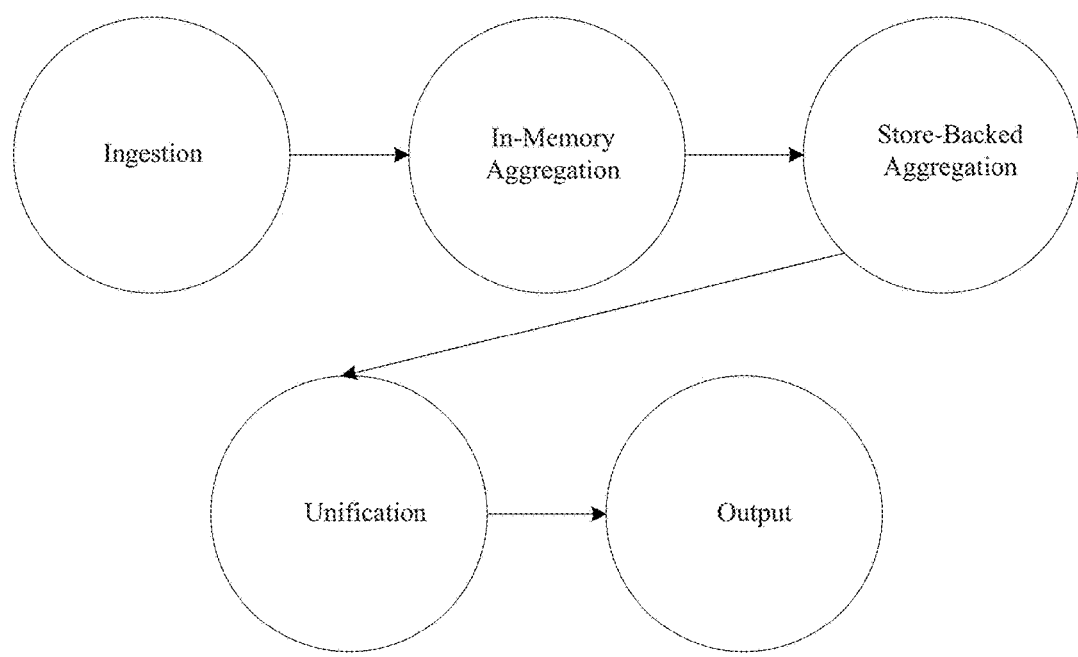
FIG. 27 depicts one implementation of the SDAS architecture.

The SDAS architecture can be broken into 5 operators, as shown in FIG. 27.

Each of the operators share these common characteristics:
The operators can be partitioned, as discussed above.
Each partition of each operator is connected to the partitions of the previous and next operators in the data aggregation pipeline.
The configuration information described in section User Configuration above is used to configure the computation performed in all of the operators of the SDAS pipeline.

Each operator of the SDAS pipeline is described in more detail below:
1. Ingestion: This stage of computation consumes events from a message queue, or another event source. The events can be serialized using JSON, Apache Avro, or another serialization format. A detailed description of how consumption from a message queue is implemented can be found above.
2. In-memory Aggregation: After events are ingested they are passed on to an in memory aggregation operator. The in memory aggregation operator computes in memory aggregations of measures for each dimension combination as defined by the configuration described in section User Configuration above. These in-memory aggregations are called intermediate aggregations. Intermediate aggregations are computed using the following series of steps:
   a. Intermediate aggregations are computed for a configurable number of processing windows called the aggregation period.
   b. When the aggregation period starts there are no intermediate aggregations.
   c. During the aggregation period tuples are received from the Ingestion operator and intermediate aggregations are computed.
   d. When the aggregation period ends, all the intermediate aggregations are sent to the next operator of the SDAS pipeline, and the in memory state of each In memory Aggregation partition is cleared.
   e. Then, steps 2-4 are repeated.
3. Unification: Intermediate aggregations are passed on to the unification operator. The unification operator is used to combine intermediate aggregations further. In particular the unification operator needs to consolidate all the intermediate aggregations across all the partitions of the In memory Aggregation operators. These unified aggregations can be called unified intermediate aggregations.
4. Store-Backed Aggregation: After the Unification operator unified intermediate aggregations are passed to the Store-Backed Aggregation operator. The Store-Backed Aggregation operator merges the unified intermediate aggregations with the true aggregations as described in section User Configuration below. The true aggregations are emitted to the Output operator according to the trigger and lateness settings as described in section Triggers and Lateness in the Store-Backed Aggregation Operator below.
5. Output: The aggregations emitted by the Store-Backed Aggregation operator are sent to a data sink by this operator.

Implementation of the Store-Backed Aggregation Operator

Figure 28:
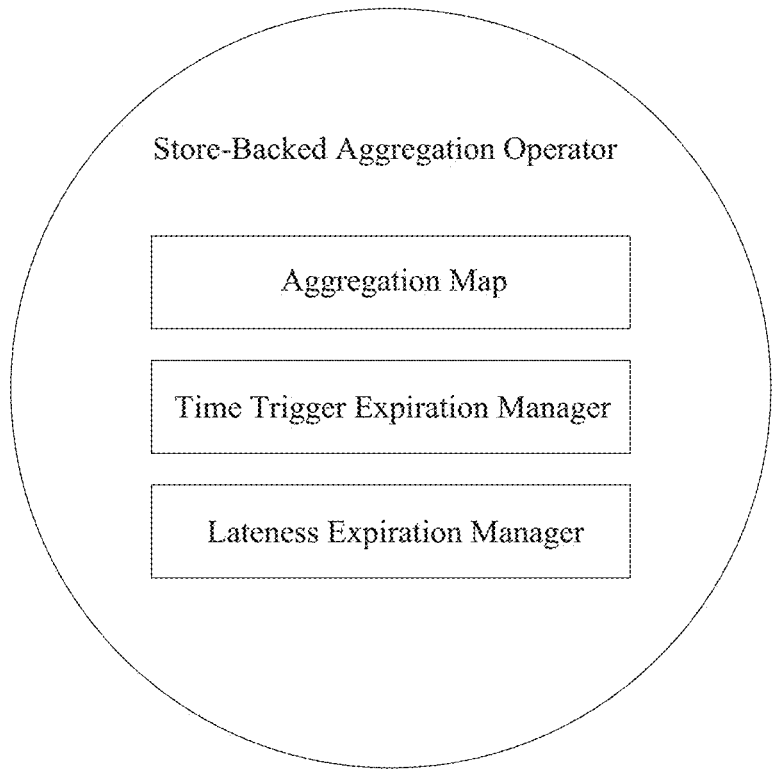
FIG. 28 is a high-level overview of the architecture of the Store-Backed Aggregation operator.

FIG. 28 is a high-level overview of the architecture of the Store-Backed Aggregation operator.

The three main pieces of the Store-Backed Aggregation Operator are:
  Aggregation Map: This is a spillable map that is used to persist the aggregations for each for each dimension combination. The details regarding the computation of aggregations are covered in section titled Computation of Aggregations in the Store-Backed Aggregation Operator.
  Time Trigger Expiration Manager: This is a spillable expiration manager that is used for implementing time based triggers. The details of how triggers are implemented are covered in section titled Triggers and Lateness in the Store-Backed Aggregation Operator.
  Lateness Expiration Manager: This is a spillable expiration manager that is used for implementing lateness. The details of how lateness is implemented are covered in section titled Triggers and Lateness in the Store-Backed Aggregation Operator.
  Note: It is possible to use a single spillable expiration manager for both time triggers and lateness instead of two separate spillable expiration managers.

Computation of Aggregations in the Store-Backed Aggregation Operator

The Store-Backed Aggregation operator receives unified aggregations for each dimension combination and combines them with the true aggregations for each dimension combination. The true aggregations for each dimension combination are stored in the aggregation map.

In order to describe the process of combining unified aggregations with true aggregations, we present an example that uses the data definition described below_and assume the store-backed aggregation operator has the same configuration as the example described in section titled Computation Walkthrough:

1. The store-backed aggregation operator starts running.
2. The store-backed aggregation operator receives a unified aggregation:
   {
     "customer": "Target",
     "time": "Monday, Jun. 26, 2017 (PDT) 5:24 PM",
     "timeBucket": "1m",
     "clicks": "105",
     "views": "30"
   }
3. The dimension combination is extracted from the unified aggregation (time="Monday, Jun. 26, 2017 (PDT) 5:24 PM", timeBucket="1m", customer="Target").
4. The dimension combination is used as a key to lookup the corresponding aggregations in the aggregation map.
5. Since this is the first unified aggregation received by the store-backed aggregation operator there are no aggregations stored in the aggregation map. So the unified aggregation is used to populate the initial aggregation for the corresponding dimension combination in the aggregation map. The state of the aggregation map is shown in FIG. 29.
6. Now the store-backed aggregation operator receives the following unified aggregation:
   {
     "customer": "Target",
     "time": "Monday, Jun. 26, 2017 (PDT) 5:24 PM",
     "timeBucket": "1m",
     "clicks": "11",
     "views": "3"
   }
7. The dimension combination is extracted from the unified aggregation (time="Monday, Jun. 26, 2017 (PDT) 5:24 PM", timeBucket="1m", customer="Target").
8. The dimension combination is used as a key to lookup the corresponding aggregations in the aggregation map.
9. The unified aggregation is combined with the aggregation fetched from the aggregation map, and the aggregation map is updated with the new aggregation.
10. The new state of the aggregation map is shown in FIG. 30.
11. Now another unified aggregation is received by the store-backed operator:
    {
      "customer": "Walmart",
      "time": "Monday, Jun. 26, 2017 (PDT) 5:30 PM",
      "timeBucket": "1m",
      "clicks": "55",
      "views": "45"
    }
12. The dimension combination is extracted from the unified aggregation (time="Monday, Jun. 26, 2017 (PDT) 5:30 PM", timeBucket="1m", customer="Walmart").
13. The dimension combination is used as a key to lookup the corresponding aggregations in the aggregation map.
14. Since this is the first unified aggregation received by the store-backed aggregation operator for this particular dimension combination, there are no corresponding aggregations stored in the aggregation map. So the unified aggregation is used to populate the initial aggregation for the corresponding dimension combination in the aggregation map. The state of the aggregation map is shown in FIG. 31.
15. The process is repeated for any new incoming unified aggregations.

Triggers and Lateness in the Store-Backed Aggregation Operator

Triggers and lateness govern the frequency at which aggregations are emitted, as well as when an aggregation is considered complete. The sections below describe the terminology and implementation details of the trigger and lateness settings available in the aggregation service.

Terminology

The way in which aggregations are emitted from the Store-Backed Aggregation operator to the Output operator is governed by triggers and lateness settings. These terms as well as the various kinds of triggers are defined below:

Trigger: A trigger is a rule that defines when updates to aggregations in the Store-Backed Aggregation operator are emitted.

Time Trigger: A time trigger defines the time interval at which aggregations are emitted from the Store-Backed Aggregation operator.

Update Trigger: An update trigger causes updates to aggregations to be immediately emitted.

Lateness: This is the interval for which an aggregation for a specific dimension combination is maintained. The interval begins for a specific dimension combination, when the first event corresponding to that dimension combination is received. After the lateness interval expires, the aggregations corresponding to the dimension combination are emitted, and the aggregations for that dimension combination are deleted from the Store-Backed Aggregation operator.

Implementation

Time triggers and lateness are implemented in the store-backed aggregation operator through the use of two spillable expiration managers. One expiration manager is used to implement time based triggers (Time Trigger Expiration Manager) and one expiration manager is used to implement lateness (Lateness Expiration Manager). Note: it is possible to use one spillable expiration manager for both time based triggers and lateness. We will now provide a high level walk-through which describes how the spillable expiration managers are used in the store-backed aggregation operator:

1. During a processing window unified aggregations are received.
2. For each unified aggregation the corresponding dimension combination is extracted, and steps 3 and 4 are performed.
3. The time trigger expiration manager is checked to see if a time trigger has been created for that dimension combination. If a trigger has already been created for the dimension combination then nothing needs to be done. Otherwise the dimension combination needs to be added to the time trigger expiration manager with an expiration duration that is equivalent to the time interval for the time trigger.
4. The lateness expiration manager is checked to see if a lateness countdown has been started for the dimension combination. If a lateness countdown has been started for the dimension combination, then nothing needs to be done. Otherwise the dimension combination needs to be added to the lateness expiration manager with an expiration duration that is equivalent to the lateness duration.
5. At the end of each processing window the expired dimension combinations are removed from the time trigger expiration manager. The expired dimension combinations are then used to look up their corresponding aggregations in the aggregation map. The aggregations are then sent from the store-backed aggregation operator to the output operator. The expired dimension combinations are then added back to the time trigger expiration manager with an expiration duration equivalent to the time trigger interval.

6. At the end of each processing window the expired dimension combinations are removed from the lateness expiration manager. The expired dimension combinations are then used to look up their corresponding aggregations in the aggregation map. The aggregations are then sent from the store-backed aggregation operator to the output operator. The expired dimension combinations are then used to remove their associated time triggers by removing them from the time trigger expiration manager. The corresponding dimension combinations are then removed from the aggregation map.

An Update trigger does not require a spillable expiration manager. The following steps describe how the update trigger is implemented:

1. A unified aggregation is received by the store-backed aggregation operator.
2. The unified aggregation is combined with the corresponding true aggregation as described in section titled Computation of Aggregations in the Store-Backed Aggregation Operator.
3. The updated true aggregation is passed on the output operator.

Streaming Data Deduplication

The technology disclosed has a highly performant Streaming Data Deduplication Service (SDDS).

Target Use Case

If the data source is unreliable and contains duplicates, then any processing done on data ingested from the source will result in inaccurate results. The target use case for our SDDS is to allow users to remove duplicate events from their data stream by comparing it to past events in their data stream. Some possible (but not all) applications for SDDS are:

Accurate aggregations on a data stream from an unreliable source.
Processing credit card transactions.

Terminology

A tuple processed by SDDS has a key which is used by SDDS to compare with past tuples and check if the tuple is a duplicate. The key of the tuple maybe a single field, for example, an ID field, or it be created from a composition of multiple fields.

When checking if a tuple is a duplicate, the tuple's key is compared to the keys of tuples within a configured time duration. This duration is relative to the current processing window's time and is called the duplicate check duration.

Given this terminology, we can describe the flow of data through the Streaming Data Deduplication Service as follows:

1. A tuple is sent to the SDDS.
2. This tuple has a key.
3. The deduplication service compares the key of the tuple with the tuples within the duplicate check duration. If there is no tuple with the same key, then the tuple is saved and emitted out. Otherwise, the tuple is considered duplicate and dropped from the data stream.

Extended Working Example

We extend the working example in above section titled Working Example by including an unreliable source which generates duplicate events and adding additional fields to our tuples. The goal of this example to show how our hypothetical digital advertiser can leverage the SDDS to get rid of the duplicate tuples and compute aggregations accurately.

Extended Data Definition

We augment the data described in above section titled Data Definition to include a host field and an optional timebucket. The host is the address of the machine that generated the advertisement event. The timebucket is a rounded timestamp. The time bucket could be rounded by second, minute, hour, or day. The timebucket can be added to the incoming data before the advertiser data is received by the SDDS or it can be added by the SDDS itself In order to deduplicate data, we define a key to use for deduplication. In one example, the key comprises the following fields:

customer
advertisement
host
timebucket

Computation Walkthrough

We will now walk through how the SDDS service identifies duplicates by considering only click events and by using one minute time buckets.

1. Let's say the digital advertiser sends a click event (Event A) that looks like:
    {
    "customer": "Target",
    "advertisement": "ad1",
    "location":
    "California", "host":
    "123.1.1.3",
    "timestamp": "Monday, Jun. 26, 2017 (PDT) 5:24:24 PM",
    "clicks": "1",
    "views": "0"
    }
2. When SDDS receives Event A it can create a timebucket from the timestamp field:
    {
    "customer": "Target",
    "advertisement": "ad1",
    "location": "California",
    "host": "123.1.1.3",
    "timestamp": "Monday, Jun. 26, 2017 (PDT) 5:24:24 PM",
    "timebucket": "Monday, Jun. 26, 2017 (PDT) 5:24 PM",
    "clicks": "1",
    "views": "0"
    }
3. Then the SDDS creates the key for Event A:
    {
    "customer": "Target",
    "advertisement": "ad1",
    "location": "California",
    "host": "123.1.1.3",
    "timebucket": "Monday, Jun. 26, 2017 (PDT) 5:24 PM"
    }
4. The SDDS then checks if it has seen the key for Event A before. Since this is the first event seen by the SDDS, it hasn't seen the key for Event A. So the key for Event A is saved in incremental state and Event A is emitted by the service.

5. The advertiser is not fault tolerant so it can generate duplicates. So, the machine that generated Event A creates a duplicate of it. Let's call that Event B:
{
"customer": "Target",
"advertisement": "ad1",
"location": "California",
"host": "123.1.1.3",
"time": "Monday, Jun. 26, 2017 (PDT) 5:24:25 PM",
"timebucket": "Monday, Jun. 26, 2017 (PDT) 5:24 PM",
"clicks": "1",
"views": "0"
}
6. The timestamp in Event B is one second after Event A. However, the key depends on the timebucket that is rounded to the nearest minute, so the keys of both Event A and Event B are the same.
7. When SDDS receives Event B, it checks if it has seen its key. Since the key of Event B is the same as the key Event A, it is identified as a duplicate and dropped from the stream.
8. Processing of additional events is done in the same manner as Event A and Event B User Configuration The main configuration for the SDDS is the duplicate check duration. Any data older than duplicate check duration is periodically removed from SDDS.

There are also optional configuration parameters for computing timebuckets from timestamps:
 bucketSpan: The width of each timebucket, for example, 1 minute, 1 hour, etc.
 referenceInstance: The start time of the first bucket.

Implementation Details

The SDDS service is composed of the following:
An input operator, which can consume events from a source.
Deduplicator operator, which deduplicates the events produced by the input operator.
An output operator, which emits deduplicated events to a sink.

The Deduplicator has the following main components:
1. Incremental State: This is the incremental state storage component described in section 3. This is used to store previously seen tuples corresponding to a key.
2. Waiting Queue: This is used to manage the futures produced by Incremental State when asynchronous reads are done from Incremental State.

The following are the steps involved in the processing of an event by the deduplicator:
1. The deduplicator receives events.
2. For each event the following steps are performed.
3. A key is computed for each event.
4. An asynchronous read from Incremental State is performed for each event to see if there was another older event, within the duplicate check duration, which had the same key.
5. If the future returned by the asynchronous read completes immediately, then the future may hold one of two possible values:
   a. Null: If the future contains a null value, then no event seen within the duplicate check duration had the same the same key as the current event. The deduplicator then saves the current event as the value associated with its key in Incremental State. Then the current event is sent to the output operator. Now we are done processing the current event.
   b. Previously Seen Event: If the future contains a previously seen event, then the current event is a duplicate event. The Deduplicator removes the current event from the stream by not emitting it to the output operator. Now we are done processing the current event.
   c. Note: The deduplicator can optionally overwrite an older tuple associated with a key in Incremental State when a new tuple associated with a key is encountered. This can be done by comparing the timestamps of the tuples in the case where tuples contain timestamps.
6. If the asynchronous read returns an incomplete future, then the deduplicator adds the current event and its corresponding future to the waiting queue. The elements in the waiting queue are periodically processed within a processing window using the procedure below. Additionally, at the end of the processing window, the procedure below is repeated until the waiting queue is empty:
   a. If the waiting queue is empty, then the process terminates.
   b. The deduplicator checks the first event and future pair in the waiting queue.
   c. If the future is complete, then the pair is removed from the queue and steps 5.a and 5.b above are performed appropriately. Then steps 6.1-6.3 are repeated.
   d. If the future is incomplete then the procedure is aborted.

Additionally the duplicate check duration is implemented by simply setting the purge duration of Incremental State to be the same as the duplicate check duration.

Computer System

Figure 32:
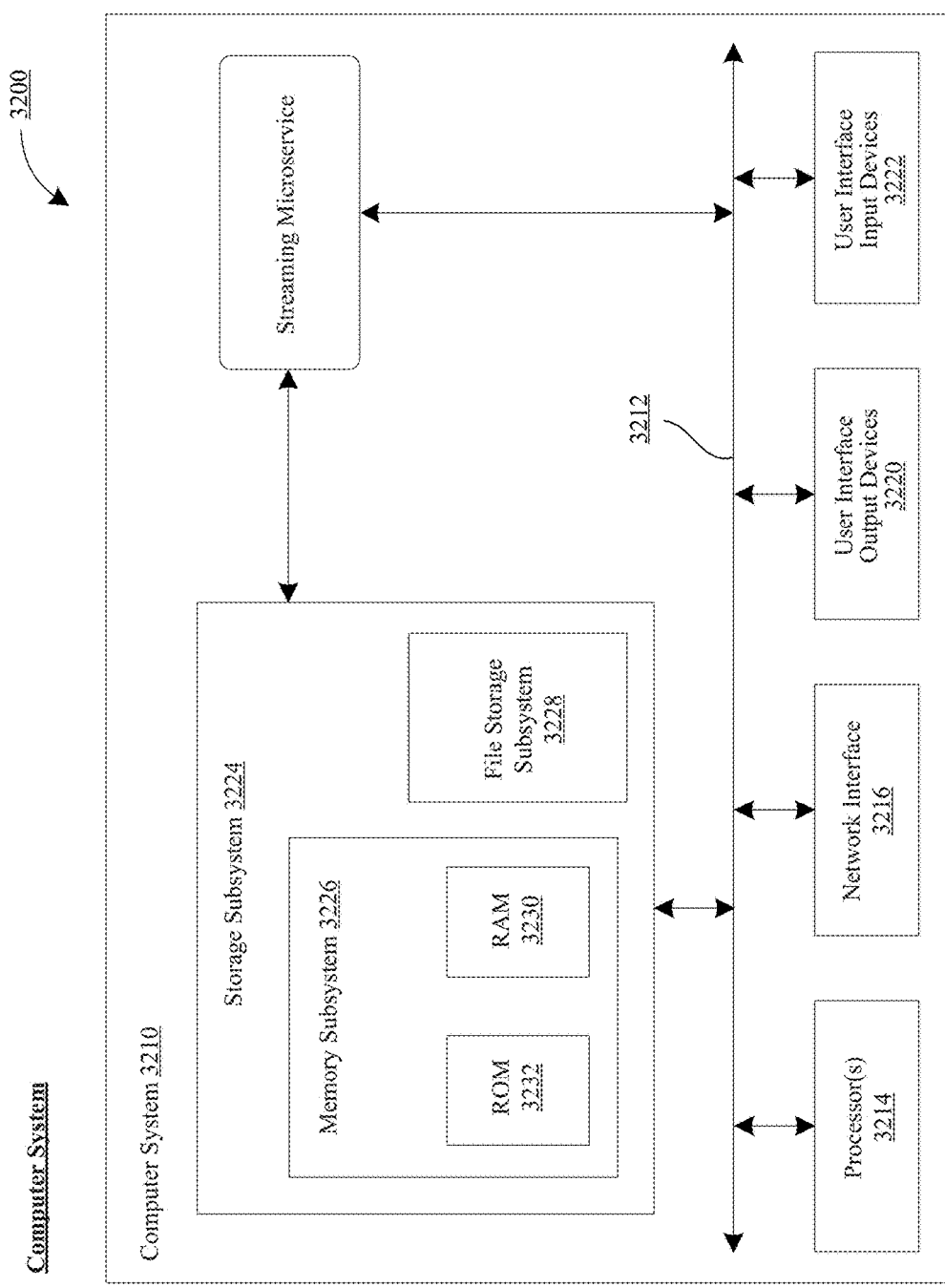
FIG. 32 is a simplified block diagram 3200 of an example computer system 3210 that can be used to implement the streaming microservices discussed above.

FIG. 32 is a simplified block diagram 3200 of an example computer system 3210 that can be used to implement the streaming microservices discussed above. Computer system 3210 typically includes at least one processor 3214 that communicates with a number of peripheral devices via bus subsystem 3212. These peripheral devices can include a storage subsystem 3224 including, for example, memory devices and a file storage subsystem, user interface input devices 3222, user interface output devices 3220, and a network interface subsystem 3216. The input and output devices allow user interaction with computer system 3210. Network interface subsystem 3216 provides an interface to outside networks, including an interface to corresponding interface devices in other computer systems.

User interface input devices 3222 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 3210.

User interface output devices 3220 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 3210 to the user or to another machine or computer system.

Storage subsystem 3224 stores programming and data constructs that provide the functionality of some or all of the modules and methods described herein. These software modules are generally executed by processor 3214 alone or in combination with other processors.

Memory subsystem 3226 used in the storage subsystem can include a number of memories including a main random access memory (RAM) 3230 for storage of instructions and data during program execution and a read only memory (ROM) 3232 in which fixed instructions are stored.

A file storage subsystem 3228 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 3228 in the storage subsystem 3224, or in other machines accessible by the processor.

Bus subsystem 3212 provides a mechanism for letting the various components and subsystems of computer system 3210 communicate with each other as intended. Although bus subsystem 3212 is shown schematically as a single bus, alternative implementations of the bus subsystem can use multiple busses.

Computer system 3210 can be of varying types including a workstation, server, computing cluster, blade server, server farm, or any other data processing system or computing device. Due to the ever-changing nature of computers and networks, the description of computer system 3210 depicted in FIG. 32 is intended only as one example. Many other configurations of computer system 3210 are possible having more or fewer components than the computer system depicted in FIG. 32.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, or an Apache HBase™ or DynamoDB™ compatible non-relational database implementation. In addition, the technology disclosed can be implemented using different programming models like distributed computing systems like Apache Hadoop™ and MapReduce™, bulk synchronous programming, MPI primitives, etc., or different scalable batch and stream management systems like Amazon Web Services (AWS)™, including Apache Mesos™ (like Apache Hadoop™), Kubernetes™ (like Apache Hadoop™), Apache Heron™ (like Apache Flink™), Apache Samza™ (like Apache Flink™), Apache Tez™ (like Apache Flink™), Google Dataflow™ (like Apache Flink™), Apache Apex™ (like Apache Flink™), Amazon Kinesis™, Apache Storm™, Apache Spark™, Apache Kafka™, Truviso™, IBM InfoSphere™, Borealis™, Yahoo! S4™, ScyllaDB™, ConcourseDB™, RethinkDB™, Apache Hive™, Google Cloud Datastore™, IBM Information Management System™ (abbreviated IMS), IBM Cloudant™, IBM Compose™, InfluxDB™, CockroachDB™, Google BigTable™, Accumulo™, and CouchDB™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

We describe systems, methods, and articles of manufacture for streaming microservices for stream processing applications. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Aggregation

A system implementation of the technology disclosed includes one or more processors coupled to the memory. The memory is loaded with computer instructions which, when executed on the processors, exactly-once process stream data.

The system includes a queue manager which receives a stream of data. The system establishes aggregation intermediation checkpoints during processing of the received data. To do this, the system partitions delivery of the data stream at offsets, saves partition demarcation offsets at the end of processing windows, and saves intermediate aggregation results to a distributed file system with a window identifier (abbreviated ID) that correlates the offsets and the aggregation results. At each checkpoint, the intermediate aggregation results can be initially saved on at least one write-ahead log (abbreviated WAL) on the distributed file system and, post-saving, persisted to storage in accordance with a fault tolerance scheme.

The system controls persistence of key-value data contributing to aggregation on a partition-by-partition basis and periodically writes out aggregations to a message queue (e.g., sink) or to a database. The aggregations can be periodically written out to a message queue or to a database, with the writing out governed by a fault tolerance scheme.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system can use same or different sets of separate nodes to read stream data from one or more queues of the queue manager, establish aggregation intermediation checkpoints during processing of the data, and periodically write out aggregations to the message queue or to the database. The operation of the nodes can be connected by processing IDs.

A cloud-based service can be used to process stream data. The cloud-based service can be at least one of Amazon Web Services™ (abbreviated AWS™), Google Cloud Platform (abbreviated GCP™), Microsoft Azure™, Rackspace™, Joyent™, IBM Cloud Computing™, and OVH™.

The system also includes a failure recovery mechanism.

The key-value data can be saved to a persistence storage database. The persistence storage database can be at least one of Apache Cassandra™, PostgreSQL™, ScyllaDB™, ConcourseDB™, RethinkDB™, Oracle Database™, Apache HBase™, Apache Hive™, Google Cloud Datastore™, IBM Information Management System™ (abbreviated IMS), IBM Cloudant™, IBM Compose™, InfluxDB™, DynamoDB™, CockroachDB™, Google BigTable™, Accumulo™, and CouchDB™.

The system also includes using one or more write-ahead logs (abbreviated WALs) for fault tolerance.

Other implementations may include a non-transitory computer readable storage medium storing instructions executable by a processor to perform functions of the system described above. Yet another implementation may include a method performing the functions of the system described above.

Deduplication

Another system implementation of the technology disclosed includes one or more processors coupled to the memory. The memory is loaded with computer instructions which, when executed on the processors, exactly-once process stream data.

The system includes a queue manager which receives a stream of data. The system establishes deduplication intermediation checkpoints during processing of the received data. To do this, the system partitions delivery of the data stream at offsets, saves partition demarcation offsets at the end of processing windows, and saves intermediate deduplication results to a distributed file system with a window identifier (abbreviated ID) that correlates the offsets and the deduplication results. At each checkpoint, the intermediate deduplication results can be initially saved on at least one write-ahead log (abbreviated WAL) on the distributed file system and, post-saving, persisted to storage in accordance with a fault tolerance scheme.

The system controls persistence of key-value data contributing to deduplication on a partition-by-partition basis and periodically writes out deduplicated unique values to a message queue (e.g., sink) or to a database. The deduplicated unique values can be periodically written out to a message queue or to a database, with the writing out governed by a fault tolerance scheme.

Each of the features discussed in this particular implementation section for the first system implementation apply equally to this system implementation. As indicated above, all the system features are not repeated here and should be considered repeated by reference.

The system can use a processing window ID to link offsets and intermediate deduplication results to establish a processing window.

The system can use same or different sets of separate nodes to read stream data from one or more queues of the queue manager, establish deduplication intermediation checkpoints during processing of the data, and periodically write out deduplicated unique values to the message queue or to the database. The operation of the nodes can be connected by processing IDs.

Other implementations may include a non-transitory computer readable storage medium storing instructions executable by a processor to perform actions of the system described above. Yet another implementation may include a method performing the actions of the system described above.

Stateful

Another system implementation of the technology disclosed includes one or more processors coupled to the memory. The memory is loaded with computer instructions which, when executed on the processors, exactly-once process stream data.

The system includes a queue manager which receives a stream of data. The system establishes stateful intermediation checkpoints during processing of the received data. To do this, the system partitions delivery of the data stream at offsets, saves partition demarcation offsets at the end of processing windows, and saves intermediate key-value pair states to a distributed file system with a window identifier (abbreviated ID) that correlates the offsets and the states results. At each checkpoint, the intermediate key-value pair states can be initially saved on at least one write-ahead log (abbreviated WAL) on the distributed file system and, post-saving, persisted to storage in accordance with a fault tolerance scheme.

The system controls persistence of key-value data contributing to statefulness on a partition-by-partition basis and periodically writes out unique values of key-value pair states to a message queue (e.g., sink) or to a database. The unique values of key-value pair states can be periodically written out to a message queue or to a database, with the writing out governed by a fault tolerance scheme.

Each of the features discussed in this particular implementation section for the first system implementation apply equally to this system implementation. As indicated above, all the system features are not repeated here and should be considered repeated by reference.

The system can use a processing window ID to link offsets and intermediate states results to establish a processing window.

The system can use same or different sets of separate nodes to read stream data from one or more queues of the queue manager, establish stateful intermediation checkpoints during processing of the data, and periodically write out unique values of key-value pair states to the message queue or to the database. The operation of the nodes can be connected by processing IDs.

The processing can involve data aggregation. The processing can also involve data deduplication.

Other implementations may include a non-transitory computer readable storage medium storing instructions executable by a processor to perform actions of the system described above. Yet another implementation may include a method performing the actions of the system described above.

Microservices Pipeline

Yet another system implementation of the technology disclosed includes one or more processors coupled to the memory. The memory is loaded with computer instructions which, when executed on the processors, connect stream processing microservices in a pipeline.

The system accepts input from an external client to a pipeline comprised of services selected by the external client. The system includes a queue manager which accepts the input in a first named queue.

The system performs a first selected service using the input from the first named queue and sends output of the first selected service to a second named queue. The system performs a second selected service using the input from the second named queue and sends output of the second selected service to a third named queue.

The system returns output to the external client from the third named queue.

Each of the features discussed in this particular implementation section for the first system implementation apply equally to this system implementation. As indicated above, all the system features are not repeated here and should be considered repeated by reference.

The system can use one or more write-ahead logs (abbreviated WALs) to store offsets at each processing window during processing of the input.

At least one of the first and second selected services can be an aggregation service. At least one of the first and second selected services can also be a deduplication service.

The system can fault tolerantly read from the first named queue to the first selected service by idempotently reading the message using a write-ahead log (abbreviated WAL).

The system can fault tolerantly write from the second selected service to the third named queue.

Other implementations may include a non-transitory computer readable storage medium storing instructions executable by a processor to perform actions of the system described above. Yet another implementation may include a method performing the actions of the system described above.

What is claimed is:

1. A computer-implemented method of exactly-once processing stream data, the method including:
   receiving a stream of data in a queue manager;
   establishing aggregation intermediation checkpoints during processing of the data, including partitioning delivery of the stream data at offsets,
   saving partition demarcation offsets at the end of processing windows, and
   saving intermediate aggregation results to a distributed file system, including a window identifier (abbreviated ID), correlated offsets for the window, and intermediate results of aggregating over the window, wherein, at each checkpoint, the intermediate aggregation results are initially saved on at least one write-ahead log (abbreviated WAL) on the distributed file system and, post-saving, persisted to storage in accordance with a fault tolerance scheme;
   controlling persistence of key-value data contributing to aggregation on a partition-by-partition basis; and
   periodically writing out aggregations to a message queue or to a database, with the writing out governed by a fault tolerance scheme.

2. The computer-implemented method of claim 1, further including using a processing window ID to link offsets and intermediate aggregation results for a processing window.

3. The computer-implemented method of claim 1, wherein same or different sets of separate nodes are used to:
   read stream data from one or more queues of the queue manager;
   establish aggregation intermediation checkpoints during processing of the data; and
   periodically write out aggregations to the message queue or to the database.

4. The computer-implemented method of claim 3, wherein operation of the nodes is connected by processing IDs.

5. The computer-implemented method of claim 1, wherein a cloud-based service is used for processing stream data.

6. The computer-implemented method of claim 5, wherein the cloud-based service is at least one of Amazon Web Services™ (abbreviated AWS™), Google Cloud Platform (abbreviated GCP™), Microsoft Azure™, Rackspace™, Joyent™, IBM Cloud Computing™, and OVH™.

7. The computer-implemented method of claim 1, further including a failure recovery mechanism.

8. The computer-implemented method of claim 1, wherein the key-value data is saved to a persistence storage database.

9. The computer-implemented method of claim 8, wherein the persistence storage database is at least one of Apache Cassandra™, PostgreSQL™, ScyllaDB™, ConcourseDB™, RethinkDB™, Oracle Database", Apache HBase™, Apache Hive™, Google Cloud Datastore™, IBM Information Management System™ (abbreviated IMS), IBM Cloudant™, IBM Compose", InfluxDB™, DynamoDB™, CockroachDB™, Google BigTable™, Accumulo™, and CouchDB™.

10. The computer-implemented method of claim 1, further including using one or more write-ahead logs (abbreviated WALs) for fault tolerance.

11. A system including one or more processors coupled to memory, the memory loaded with computer instructions to exactly-once process stream data, the instructions, when executed on the processors, implement actions comprising:
    receiving a stream of data in a queue manager;
    establishing aggregation intermediation checkpoints during processing of the data, including
      partitioning delivery of the stream data at offsets,
      saving partition demarcation offsets at the end of processing windows, and
      saving intermediate aggregation results to a distributed file system, including a window identifier (abbreviated ID), correlated offsets for the window, and intermediate results of aggregating over the window, wherein, at each checkpoint, the intermediate aggregation results are initially saved on at least one write-ahead log (abbreviated WAL) on the distributed file system and, post-saving, persisted to storage in accordance with a fault tolerance scheme;
    controlling persistence of key-value data contributing to aggregation on a partition-by-partition basis; and
    periodically writing out aggregations to a message queue or to a database, with the writing out governed by a fault tolerance scheme.

12. The system of claim 11, further implementing actions comprising using a processing window ID to link offsets and intermediate aggregation results for a processing window.

13. The system of claim 11, wherein same or different sets of separate nodes are used to:
    read stream data from one or more queues of the queue manager;

establish aggregation intermediation checkpoints during processing of the data; and
periodically write out aggregations to the message queue or to the database.

14. The system of claim 13, wherein operation of the nodes is connected by processing IDs.

15. The system of claim 11, further implementing actions comprising a failure recovery mechanism.

16. The system of claim 11, further implementing actions comprising using one or more write-ahead logs (abbreviated WALs) for fault tolerance.

17. A non-transitory computer readable storage medium impressed with computer program instructions to exactly-once process stream data, the instructions, when executed on a processor, implement a method comprising:
receiving a stream of data in a queue manager;
establishing aggregation intermediation checkpoints during processing of the data, including
partitioning delivery of the stream data at offsets,
saving partition demarcation offsets at the end of processing windows, and
saving intermediate aggregation results to a distributed file system, including a window identifier (abbreviated ID), correlated offsets for the window, and intermediate results of aggregating over the window, wherein, at each checkpoint, the intermediate aggregation results are initially saved on at least one write-ahead log (abbreviated WAL) on the distributed file system and, post-saving, persisted to storage in accordance with a fault tolerance scheme;
controlling persistence of key-value data contributing to aggregation on a partition-by-partition basis; and
periodically writing out aggregations to a message queue or to a database, with the writing out governed by a fault tolerance scheme.

18. The non-transitory computer readable storage medium of claim 17, implementing the method further comprising using a processing window ID to link offsets and intermediate aggregation results for a processing window.

19. The non-transitory computer readable storage medium of claim 17, wherein same or different sets of separate nodes are used to:
read stream data from one or more queues of the queue manager;
establish aggregation intermediation checkpoints during processing of the data; and
periodically write out aggregations to the message queue or to the database.

20. The non-transitory computer readable storage medium of claim 17, implementing the method further comprising using one or more write-ahead logs (abbreviated WALs) for fault tolerance.

* * * * *